United States Patent
Beith et al.

(10) Patent No.: US 6,449,496 B1
(45) Date of Patent: Sep. 10, 2002

(54) VOICE RECOGNITION USER INTERFACE FOR TELEPHONE HANDSETS

(75) Inventors: Scott D. Beith; Ning Bi; Chienchung Chang; Karthick Chinnaswami; Andrew P. DeJaco, all of San Diego; Jason B. Kenagy, Encinitas; Robert Opalsky; George Pan, both of San Diego, all of CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/246,499

(22) Filed: Feb. 8, 1999

(51) Int. Cl.⁷ .............................. H04B 1/38; H04M 1/00
(52) U.S. Cl. .................... 455/563; 455/567; 379/88.03; 379/88.04
(58) Field of Search ................................ 455/412, 413, 455/460, 550, 564, 565, 575, 563, 414, 418, 425, 458, 79, 567, 569; 379/88.01, 88.02, 88.03, 88.04, 355, 88.17, 89.19; 704/275, 270

(56) References Cited

U.S. PATENT DOCUMENTS

| | | | |
|---|---|---|---|
| 4,320,256 A | | 3/1982 | Freeman ..................... 179/6.04 |
| 4,348,550 A | | 9/1982 | Pirz et al. ......................... 179/1 |
| 4,644,107 A | | 2/1987 | Clowes et al. ............... 379/354 |
| 4,853,953 A | | 8/1989 | Fujisaki ......................... 379/88 |
| 4,864,622 A | | 9/1989 | Iida et al. ....................... 381/41 |
| 4,928,302 A | | 5/1990 | Kaneuchi et al. ............. 379/88 |
| 5,007,081 A | | 4/1991 | Schmuckal et al. ......... 379/354 |
| 5,222,121 A | * | 6/1993 | Shimada ................... 379/88.03 |
| 5,325,421 A | | 6/1994 | Hou et al. ...................... 379/67 |
| 5,483,579 A | * | 1/1996 | Stogel ............................ 379/88 |
| 5,566,229 A | * | 10/1996 | Hou et al. ...................... 379/88 |
| 5,594,784 A | * | 1/1997 | Velius ............................ 379/88 |
| 5,625,572 A | * | 4/1997 | Yonekura et al. ............ 702/183 |
| 5,787,152 A | * | 7/1998 | Freadman ................. 379/88.01 |
| 5,832,063 A | * | 11/1998 | Vysotsky et al. .............. 379/88 |
| 5,864,603 A | * | 1/1999 | Haavisto et al. ............... 379/88 |
| 5,892,813 A | * | 4/1999 | Morin et al. ............. 379/88.01 |
| 5,991,637 A | * | 11/1999 | Mack, II et al. ............. 455/550 |
| 6,061,651 A | * | 5/2000 | Nguyen ....................... 704/233 |
| 6,098,043 A | * | 8/2000 | Forest et al. ................. 704/270 |
| 6,167,251 A | * | 12/2000 | Segal et al. .................. 455/406 |
| 6,212,408 B1 | * | 4/2001 | Son et al. .................... 455/563 |
| 6,289,140 B1 | * | 9/2001 | Oliver ......................... 382/313 |

FOREIGN PATENT DOCUMENTS

| | | | | |
|---|---|---|---|---|
| EP | 0618710 | | 10/1994 | ............ H04M/1/27 |
| EP | 0739121 | | 10/1996 | ............ H04M/1/27 |
| EP | 0788268 | | 8/1997 | ............ H04M/1/27 |
| GB | 2317781 | | 8/1997 | ............ H04M/1/00 |
| WO | 9903254 | | 1/1999 | ............ H04M/11/00 |

* cited by examiner

*Primary Examiner*—Lester G. Kincaid
*Assistant Examiner*—Charles R Craver
(74) *Attorney, Agent, or Firm*—Philip R. Wadsworth; Charles D Brown; George C. Pappas

(57) ABSTRACT

A method and apparatus providing a user interface within a phone that responds to a limited vocabulary of user trained voice commands. The interface allows users to perform all phone handset dialing functions using voice commands. Additionally, users will be able to create and modify entries within a voice recognition phonebook, whereby a number within the voice recognition phonebook can be called by saying the name associated with the number. The user interface provides a combination of voice and LCD displayed user prompts and responses to voice input. The interface responds to user voice commands and performs the command functions based upon matches to previously user trained voice command vocabulary words stored in memory.

9 Claims, 33 Drawing Sheets

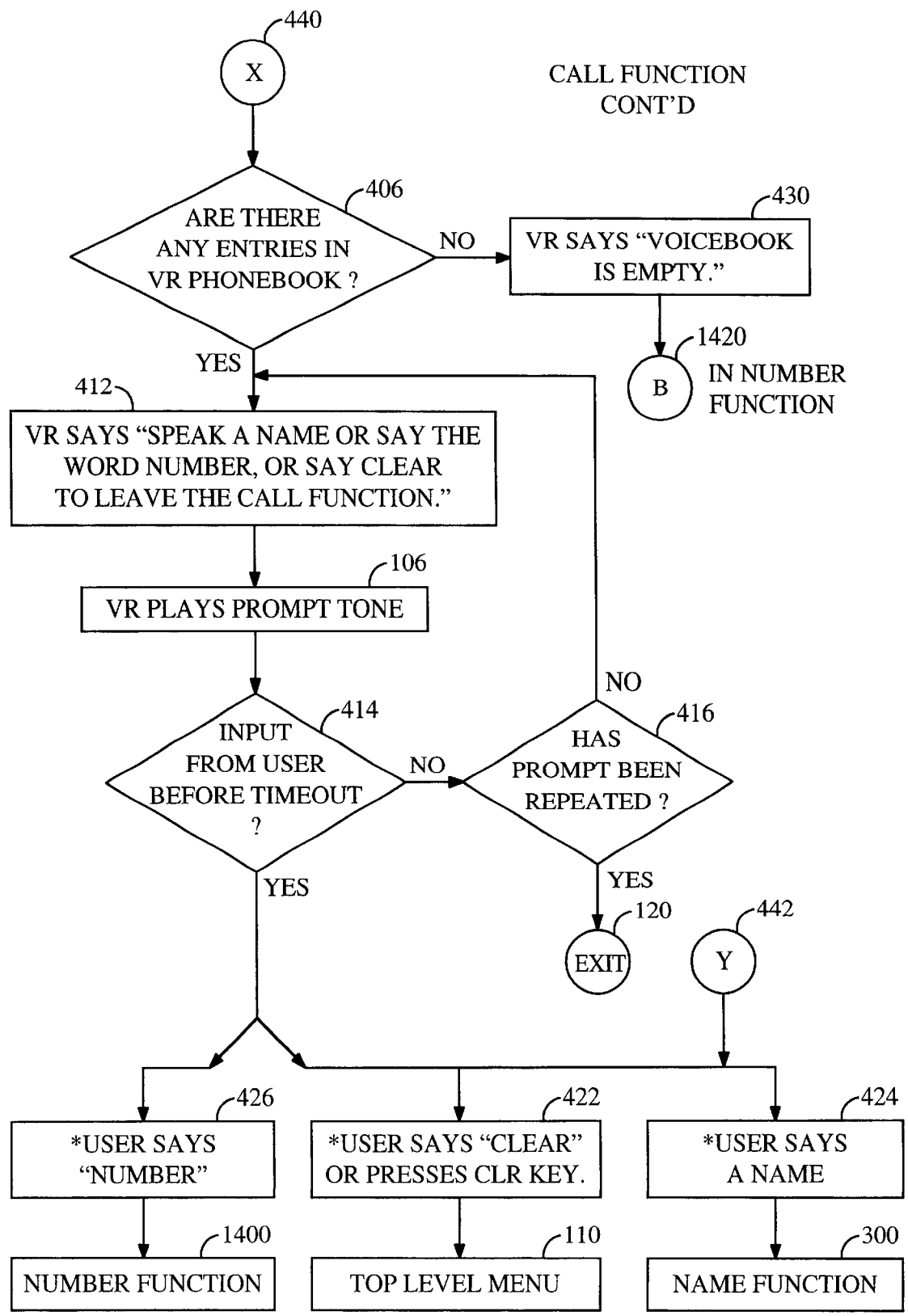
FIG. 3B  * STS AND REJECTION DEVICES PRESENT

VOICE RECOGNITION USER INTERFACE FOR TELEPHONE HANDSETS

The present application addresses a method and apparatus for a Voice Recognition User Interface For Telephone Handsets. Other applications filed simultaneously herewith and detailing related inventions include "Communication Protocol Between A Communication Device And An External Accessory", Qualcomm Inc. Ser. No. 09/248,514.

BACKGROUND OF THE INVENTION

I. Field of the Invention

The present invention relates to communications and telecommunication devices. More particularly, the present invention relates to a novel and improved voice recognition user interface and related method for use with a portable phone and related hands free phone accessory.

II. Description of the Related Art

User interfaces continue to represent a field of ongoing advancement. Technological innovations allow consumer operated devices such as cellular phones to have a large number of functions accessible to the user through myriad menu options. Cellular phones typically incorporate LCD displays to show user prompts and menu options. Cellular phones also incorporate softkeys whose function changes depending on the active menu. The softkey function is typically indicated on the LCD display. Cellular phones commonly combine numerous features including the ability to store a user defined phonebook of commonly called numbers, single button last number redial capability, previously called number memory, and caller phone number identification. Furthermore, small handheld cellular phones typically can be combined with accessories like hands free car kit adapters that allow users to operate the phone in their car without the need to hold it in their hand.

The ability to operate the phone without having to hold on to it comes with some disadvantages. A user is still required to look at the phone display for prompts and is required to dial numbers and search through the phone's directory with manual keystrokes. This can present an obstacle for a user that is driving and simultaneously attempting to navigate the various menus available on the phone. The present invention solves these problems by incorporating into the telephone handset or hands free kit (HFK) a voice recognition user interface that allows complete hands free dialing. Additionally, the method of the present invention provides additional functions that utilize voice recognition. The voice recognition user interface is used in conjunction with the standard phone user interface to greatly minimize the number of manual keystrokes required of the user.

SUMMARY OF THE INVENTION

The present invention is a novel and improved method and apparatus implementing a voice recognition enhanced phone user interface. A method is disclosed for allowing users complete dialing function accessibility through voice recognition. This allows a user to have a true hands free phone interface.

The voice recognition user interface may be implemented in software code running on a microprocessor or as a hardwired device. Voice Recognizer (VR) may be described as a process or method for effecting an interface between a user and a phone having voice recognition capabilities. The details of the voice recognition process per se are not the subject of this application and are not discussed. This application deals only with the interface between a user and a phone that has been provided with voice recognition capabilities.

In a preferred embodiment, a method is disclosed whereby a user can enter voice recognition mode from a standby phone mode by either saying an activation term, such as "wake-up", twice or by pressing a handset key. In the preferred embodiment detailed below, the method first checks to see if initial voice training has previously been performed. If voice training has previously been performed, the preferred method continues to the top level menu. However, if voice training has not been performed, the method initiates a training menu.

The preferred method includes two vocabulary sets that require training, the Basic Set and the Digit Set. The Basic Set includes user command terms whereas the Digit Set includes words associated with keypad and dialing functions. In the preferred method, the user is prompted by the phone to say successive words in the vocabulary set that is being trained. The user is prompted to repeat the word and then if Voice Recognizer decides both utterances of the word match, it saves that word. The training method continues until all words in the current vocabulary set have been trained.

In the top level menu, the preferred method allows the user voice command access to four functions and, by saying "Sleep", the ability to exit Voice Recognizer (VR). At the top level menu, the method allows the user to initiate the commands "Redial", "Call", "Voicebook", or to say a name previously saved in the Voice Recognizer phonebook. Each of the possible voice commands at the top level menu, "Redial", "Call", "Voicebook", or a name will, in the preferred method, initiate the corresponding function.

The Redial Function in the preferred method enables the user, through voice commands, to originate a call to the last number dialed.

The Call Function enables the user to originate phone calls using voice commands by saying a name within the Voice Recognizer phonebook or by entering a Number Function that allows a phone number to be entered and originated through voice commands. In the Call Function, the method first checks to see that Digit Set training has been completed. The method then checks to see if there are any entries in the Voice Recognizer (VR) phonebook. If Digit Set training has not been completed and the VR phonebook is empty, the method instructs the VR to inform the user of that status and to return to the top level menu within the VR mode. As long as the VR phonebook is not empty, VR will prompt the user for a name. If the user speaks a name, VR commences the Name Function. If Digit Set training has been completed the user can additionally access the Number Function by saying, "Number". The Number Function is not accessible in the preferred method if Digit Set training has not been completed. Conversely, the Number Function is the only function available if Digit Set training has been completed and the VR phonebook is empty.

In the Number Function, the method prompts the user to say digits in a phone number or to request "Call" or "Verify". The user is allowed to enter a phone number, one digit at a time, up to 32 digits in length. The method allows the user to erase incorrectly entered digits one at a time by saying, "Clear". The clear command causes the last entered digit to be deleted. The preferred method also allows the user to verify the entered phone number by saying, "Verify". If the user commands "Verify", VR will read back the entered digits and then follow with a prompt to enter more digits.

This allows a user to verify digits entered prior to completing entry of an entire phone number. The "Verify" command can similarly be used to verify an entered phone number prior to originating a call. After digits have initially been entered, the user can originate a phone call by saying, "Call".

The Name Function incorporated by the method allows the user to recall phone numbers in the VR phonebook by saying the name associated with the phone number. In the top level menu or in the Call Function when a user says a name VR checks to see if multiple names in the VR phonebook match that name. If multiple names in the VR phonebook match the user name request, VR compiles a list of names that match then asks the user if the best match was the one requested. If the user does not agree, VR continues by asking if the next best match was the one requested. VR continues this loop until the user agrees with a match or VR exhausts the list of matching entries. If VR exhausts the list of matching entries, VR cancels the Name Function and returns to the top level menu. If the user agrees with one of the matches, VR continues as if this were the only name that matched. If only one name matches, VR requests affirmation of the name to call. If the user affirms, VR is exited and the call is originated. If the user does not affirm, VR cancels the Name Function and returns to the top level menu.

The preferred method allows the Voicebook Function to be accessed at the top level menu. Some functions can be accessed through voice commands while access to other functions require user input via the handset keypad. Upon entry into the Voicebook Function, VR prompts the user to say "Add", "Delete", "List", or to select from the keypad options.

The List function allows the user to browse through the VR phonebook. In response to the user saying, "List" in the voicebook menu, VR checks to see if the VR phonebook is empty. If the VR phonebook is empty, then there are no entries to browse through. If the VR phonebook is not empty, VR reads the names in the VR phonebook and continues until the final entry is reached or VR is interrupted by the user.

The user says, "Add" to make additions to the VR phonebook. If the VR phonebook is not full, VR asks the user for the name to add. Once the user says a name, VR prompts the user to repeat the name. After the user repeats the name VR first checks to see that the new name does not match one of the command words. If the name matches a command word, the user is told which command word that the name is close to and is instructed to say another name. VR is then directed to the beginning of the name input loop of the Add Function. If the name does not match one of the command words, VR checks to see that both utterances of the name match. If the two words do not match VR tells the user the match was unsuccessful and to try again. After an unsuccessful match, VR returns to the first prompt of the Add Function. Following a successful match, VR checks to see if the handset phonebook (not the VR phonebook) contains any entries. If the handset phonebook is empty, VR instructs the user to use the keypad to enter a phone number. Once the user has completed the phone number entry, VR tells the user that the name was added to the VR phonebook. VR saves the number and returns to the Voicebook Function. If the handset phonebook is not empty, VR allows the user to enter the phone number using the keypad or scroll through the handset phonebook to find a number to assign to the name. Once a number has been entered, either by scrolling through the handset phonebook or by keypad entry, the user presses the "ADD" key to save the number in the VR phonebook. VR then tells the user that the name was added to the VR phonebook. VR saves the number and returns to the Voicebook Function.

The user enters the Delete Function by saying "Delete" in the Voicebook Function. VR first checks to see that there are entries in the VR phonebook. If there are entries in the VR phonebook, VR asks the user for the name to delete. Additionally, a softkey on the phone will indicate "NEXT". If the user responds with a name, VR first checks to see if multiple names in the VR phonebook match. If multiple names match, VR compiles the list of matching names, determines the best match, and asks the user if the best match was the one spoken by the user. If the user answers "no", VR repeats the request using the next best match. This is repeated until the list of matching names is exhausted or the user agrees to the match. If all possible matching names are exhausted without finding a match, VR returns to the top of the Delete Function. If the user agrees with a match, VR deletes the name and number from memory and tells the user that name is deleted. If only one name in the VR phonebook matches, VR asks the user if that is the name to delete. If the user replies "yes", VR tells the user the name is deleted and returns to the top level menu. If the user replies "no", VR returns to the top of the Delete Function.

If the "NEXT" softkey on the phone is depressed, VR retrieves the next name from the VR phonebook and asks the user if that is the name to delete. VR then continues through the process in the same manner as if the user initially spoke the name.

The keypad option at the top of the Voicebook Function allows the user to choose to clear VR book entries. The clear book option is only provided as a keypad function since it is not heavily used. The clear book function will clear all VR phonebook entries.

The training function provides further keypad options corresponding to Basic Set training, Digit Set training, or Retraining. The Basic Set training and Digit Set training have been summarized above and will be further described in the detailed description below. The Retrain Function allows for only portions of the Basic Set or Digit Set to be retrained. The user is prompted to choose the key associated with the Basic Set or the Digit Set. Once the user makes this choice, VR retrieves the first word from the corresponding vocabulary set and asks the user if that is the word to be retrained. If the user agrees, VR instructs the user to retrain the word and following retraining, retrieves the next word from the vocabulary set and repeats the process until all words have been exhausted. If, when asked if a word is to be retrained, the user responds with "no", VR advances to the next word in the vocabulary set and repeats the query with the new word. Whether or not the user actually chooses to retrain them, when all of the words in the vocabulary set have been queried VR tells the user that retraining is complete and returns to the top level menu.

The ability to answer incoming calls in a hands free mode is as important as the ability to initiate calls in a hands free mode. The method addresses this by incorporating a feature that allows voice commanded call answering. When there is an incoming call, VR tells the user there is an incoming call and asks the user whether or not to answer the call. If the user answers "yes" the call is answered. If the user answers "no", there are no further call voice alerts for this incoming call.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 3A–3B are flowcharts illustrating the Call Function, which provides the user an interface for originating calls;

DETAILED DESCRIPTION OF THE PREFERRED EMBODIMENTS

The blocks in the various Figures may be thought of as representing states of the interface, steps of a process, or blocks of hardware required to implement the corresponding function of the block.

Figure 1:
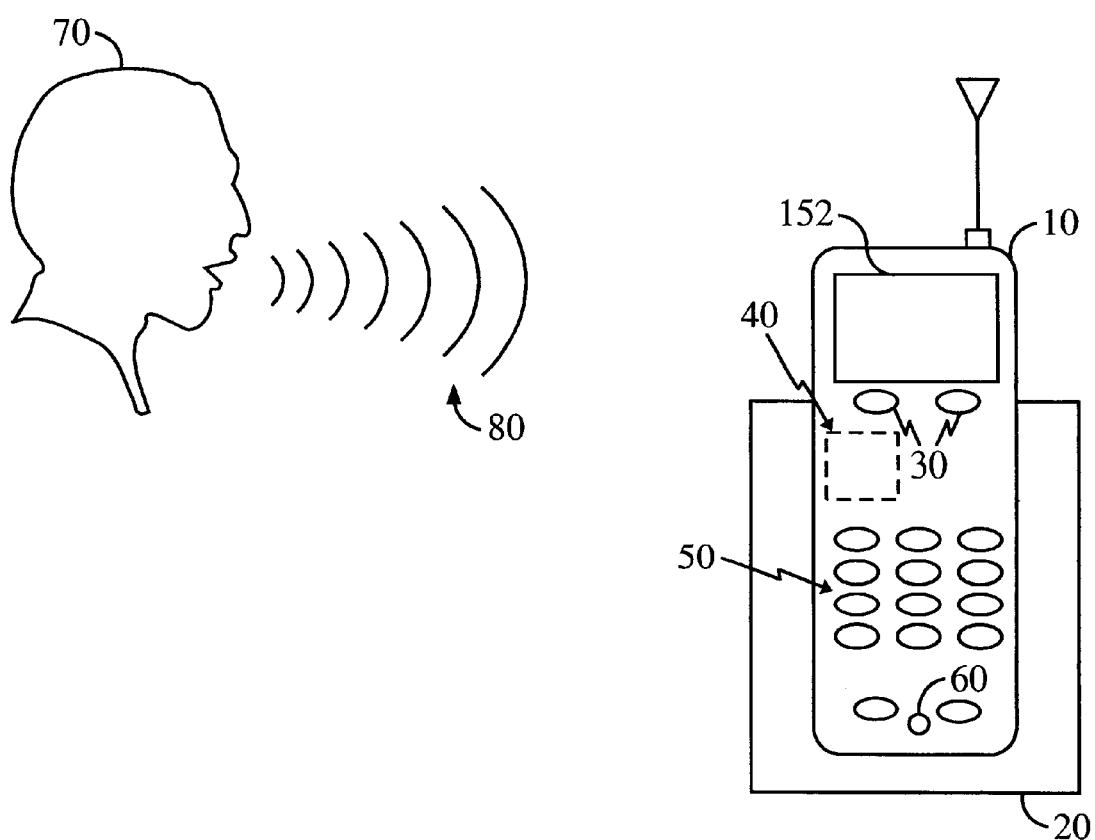
FIG. 1 illustrates a user and phone within a handset cradle or hands free kit.

Referring to FIG. 1, the novel features of the voice recognition user interface include the ability of a user 70 to command a phone 10 using only voice input 80. In the preferred embodiment, the phone 10 is a cellular handset within a hands free kit 20. When the phone 10 is cradled within the hands free kit 20, an interface between the phone and the hands free kit (not shown) allows RF, control, and audio signals to be passed through the hands free kit. A typical cellular phone features a display 152 as well as softkeys 30 which operate different functions shown on the display 152. Additionally, the phone or handset 10 as it is commonly referred, contains a keypad 50 as well as a microphone 60 to receive user voice input 80. Phone functionality is controlled through a microprocessor within the phone that receives program code and stores information in memory 40 (not visible external to the phone).

Figure 2A:
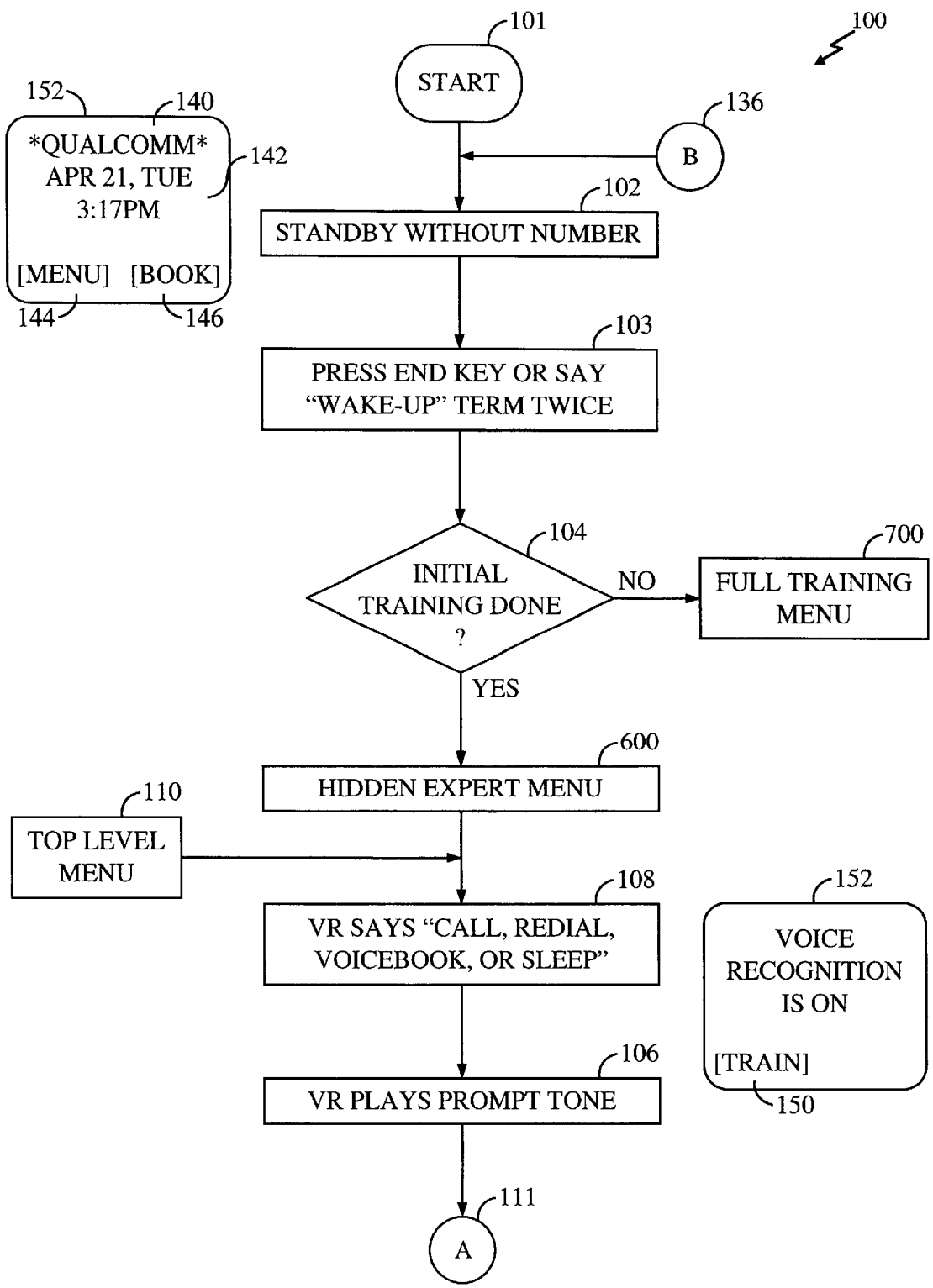
FIG. 2A–2B are flowcharts illustrating the Top Level Function which provides access to all other functions.
Figure 12A:
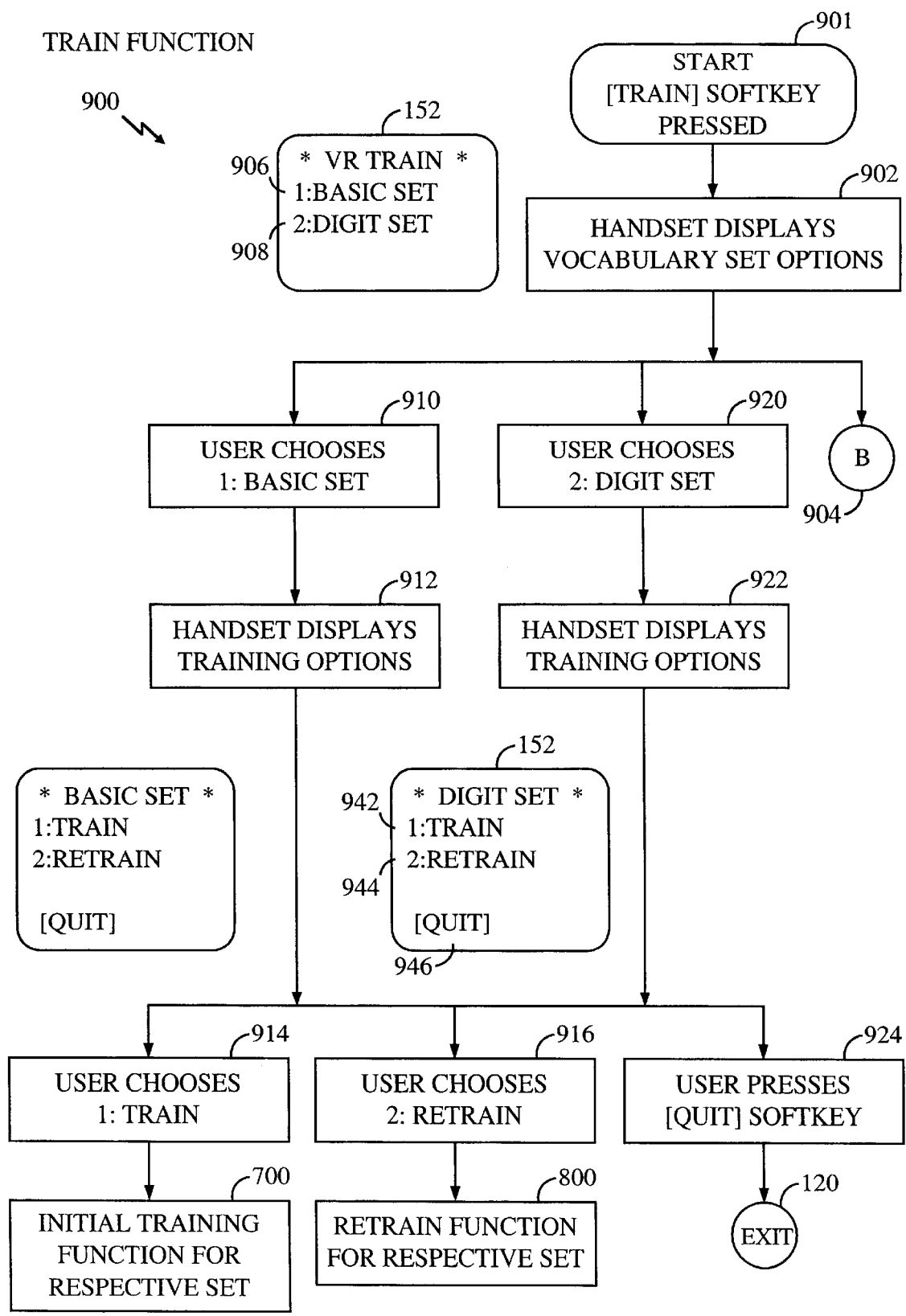
FIG. 12A–12B are flowcharts illustrating the Train Function, which the user utilizes to access specific training functions.
Figure 12B:
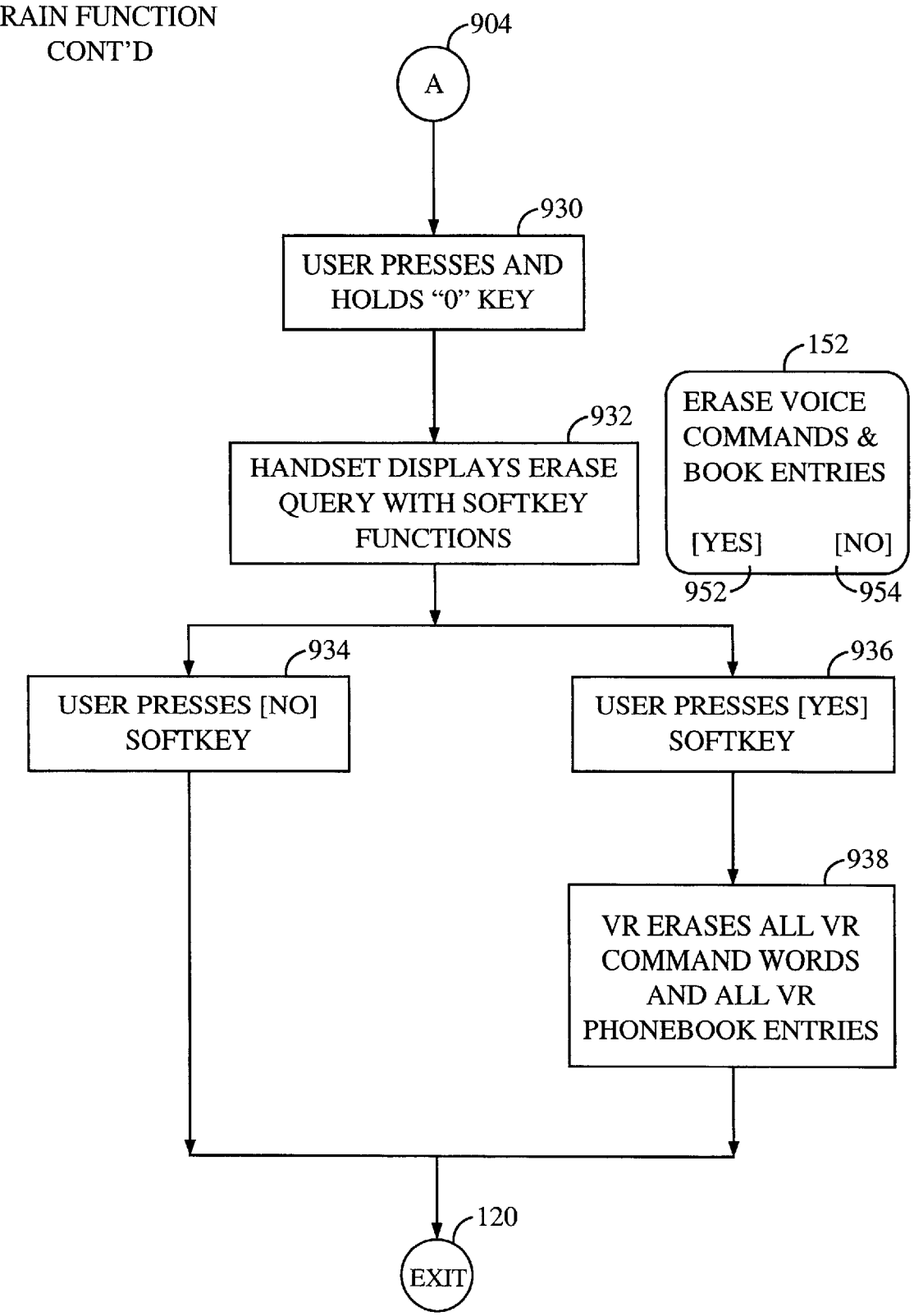

Referring to FIG. 2A, when a mobile phone is in the state Standby without a number 102, the phone display 152 typically shows information such as a header 140, the current system date and time 142, and the current softkey choices 144 and 146. Voice Recognizer (VR) is in the sleep mode. The user can enter Voice Recognizer to enable voice commanded phone functions. The user is able to exit sleep mode and enter VR active mode either by pressing the END key or by saying the "Wake Up" term twice at step 103. At this point, in step 104, VR checks to see whether or not initial training has been performed. If not, VR proceeds to full training 700. If some initial training has been performed, VR proceeds to the Hidden Expert Menu 600. The Hidden Expert Menu 600 allows the user the same functionality as in the top level menu but the user does not need to wait for the top level menu prompt. The Hidden Expert Menu 600, which is only active for 1.5 seconds, will be described in further detail below. The point after the Hidden Expert Menu 600 represents the top level menu state 110 which other menus and functions may return to following completion or cancellation of their process. At the top level menu state 110 VR says to the user, in step 108, "Call, Redial, Voicebook, or Sleep." VR also plays a prompt tone 106. The display 152 on the handset indicates that Voice Recognition is on. Additionally, the handset shows a Train softkey 150 is available to access the Train Function as shown at 900 (FIG. 12A–B).

Figure 2B:
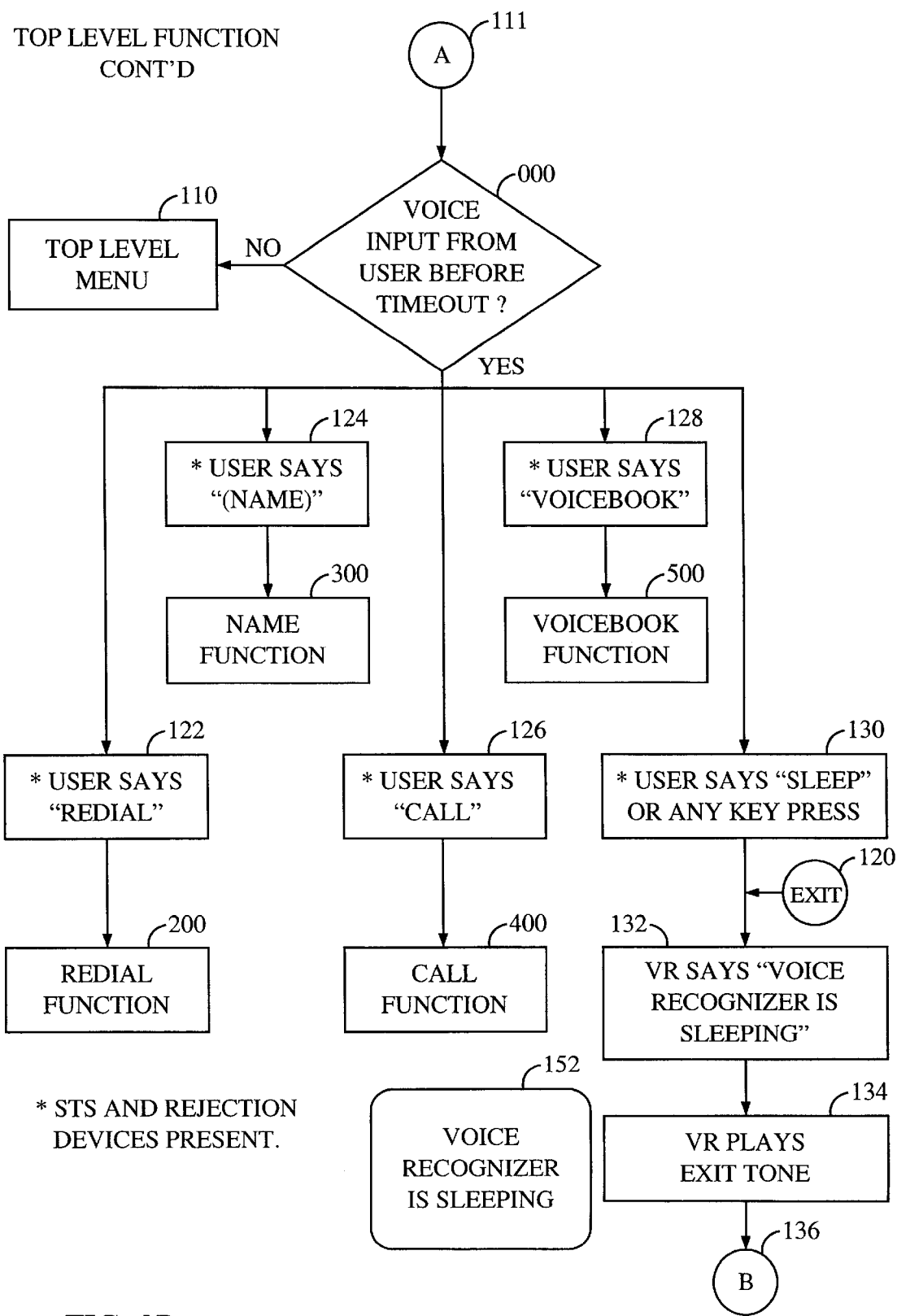

Referring to FIG. 2B, after playing the prompt tone 106 VR proceeds to state 112 and waits for user voice input before timeout. If VR times out in state 112, VR will return to the top level menu 110 and again prompt the user in state 108 by saying, "Call, Redial, Voicebook, or Sleep." VR again plays the prompt tone 106. VR then returns to block 112 to again await user voice input. The user has the option of saying one of four commands or the name of an entry in the VR phonebook. The commands available are Redial, Call, Voicebook, and Sleep. The commands Redial, step 122, Call, step 126, and Voicebook, step 128, will cause VR to initiate the corresponding function 200, 400, and 500, each of which is described in detail below. Similarly, if a user says a name that is in the VR phonebook, the Name Function 300 will be initiated. If the user says the voice command "Sleep" or presses any key, step 130, VR will exit back to standby or sleep mode. The state initiating the exit process is shown in FIG. 2B as 120. VR says, "Voice recognizer is sleeping" in state 132 and plays an exit tone 134. The handset display 152 shows "Voice Recognizer is sleeping." VR then returns to standby state 102.

Figure 3A:
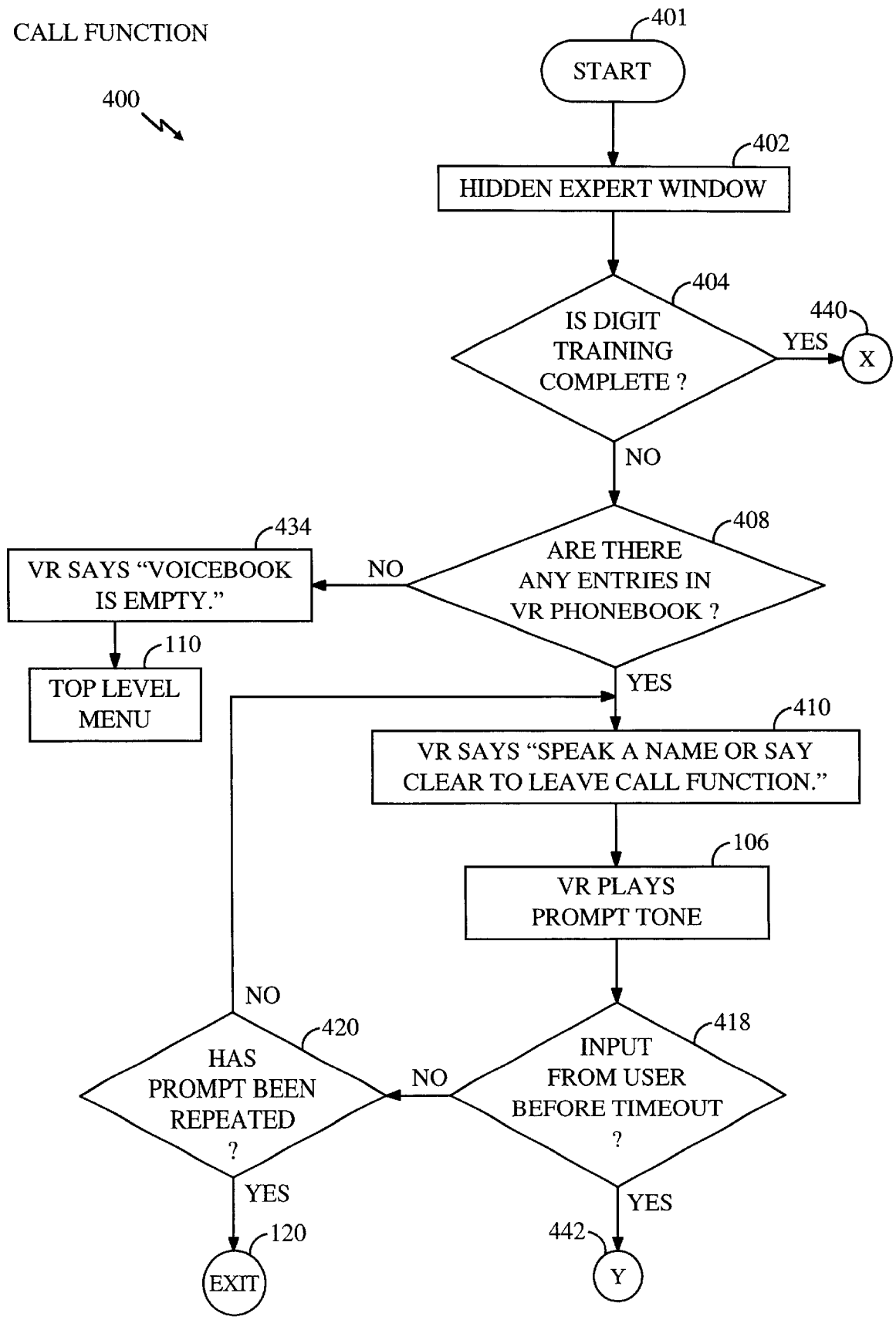

Referring to FIG. 3A, the Call Function 400 is entered after the user voices the "Call" command at the top level menu 110 or the Hidden Expert Menu 600. Immediately upon entering the Call Function 400, the user is given about a 1.5 second state 402 where a hidden expert window is open. This hidden expert window 402 is different from the Hidden Expert Menu 600 available in the Top Level Function 100. The hidden expert window in state 402 allows the user access to all Call Function commands without having to wait for the prompt. If the user does not initiate a command within the 1.5 second window, Call Function proceeds to state 404 where VR checks to see if Digit training has been completed. The Call Function then advances to state 406 (FIG. 3B) or state 408 depending on whether Digit training has been completed. In both states 406 and 408 VR checks to see if there are any entries in the VR phonebook.

If there are no entries in the VR phonebook and Digit Set training has not been completed, Call Function proceeds to state 434. VR says, "Voice book is empty." then exits from the Call Function and returns to the top level menu, state 110. This is done since the user can access no Call Function commands if Digit Set training has not been performed and there are no entries in the VR phonebook.

If Digit Set training has not been performed but the VR phonebook is not empty, the "Number" command will not be accessible to the user but the "name" command will be available. Under this condition, Call Function flow proceeds to state 410. VR says, "Speak a name or say clear to leave Call Function." VR plays a prompt tone 106 and proceeds to 418 to wait for user input. If timeout occurs in state 418 prior to user input, VR proceeds to state 420 where VR checks to see if the previous prompt has been repeated. If the prompt has not been repeated VR returns to state 410. If the prompt has already been repeated VR proceeds to state 120 which causes the function to exit VR.

Figure 4A:
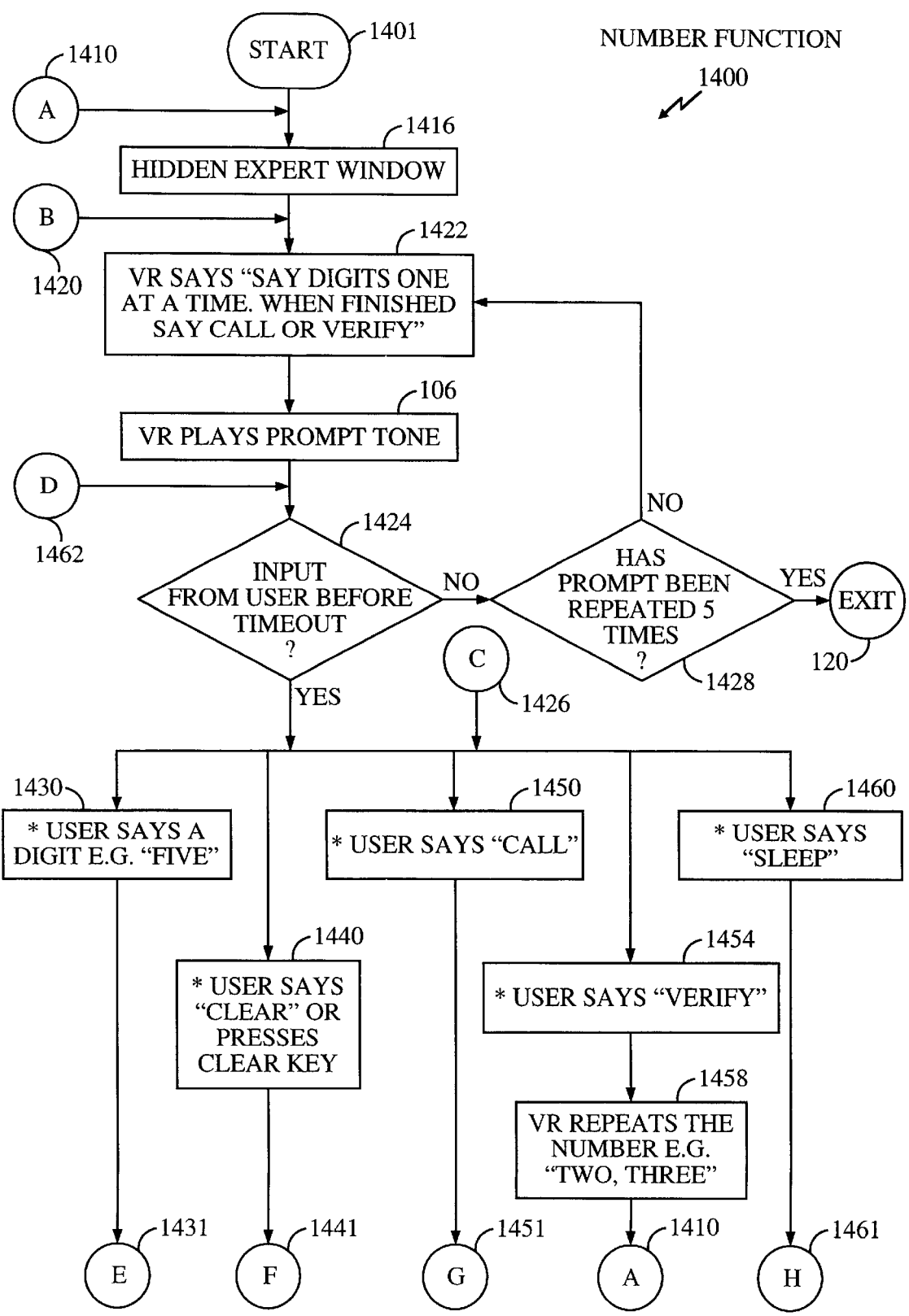
FIG. 4A–4C are flowcharts illustrating the Number Function that provides for call origination by allowing the user to say the digits of a phone number.

Referring to FIG. 3B, if there are no entries in the VR phonebook but Digit Set training has been completed, Call Function proceeds to state 430. VR says, "Voice book is empty." and proceeds to state 1420 in the Number Function 1400 (FIG. 4A). Since there are no entries in the VR phonebook, the user is not able to use the "name" command and is only able to use the "Number" command. Therefore, the function routes flow directly to the number prompt.

If Digit Set training has been completed and there are entries in the VR phonebook, the user is able to access all commands within the Call Function. Call Function flow proceeds to state 412 where VR says, "Speak a name or say the word number or say clear to leave the Call Function." VR plays a prompt tone 106 and proceeds to state 414 to wait for user input. If timeout occurs in state 414 prior to user input, VR proceeds to state 416 where VR checks to see if the previous prompt has been repeated. If the prompt has not been repeated VR returns to state 412. If the prompt has already been repeated, VR proceeds to state 120, which causes the function to exit VR.

If the user responds in either the first or second response windows provided in states 414 and 418, Call Function flow proceeds in one of three ways depending upon whether the user commands "Number", state 426, "Clear", state 422, or speaks a name from the VR phonebook, state 424. If the user speaks a name from the VR phonebook, state 424, VR proceeds to the Name Function 300. If the user says, "Clear" or presses the CLR key, state 422, VR cancels the Call Function and returns to the top level menu 110.

Referring to FIG. 4A, if the user says, "Number", state 426, VR proceeds to the Number Function 1400. In the Number Function 1400, VR first provides state 1416 where a hidden expert window is available for 1.5 seconds. This hidden expert window 1416 is distinct and separate from the Hidden Expert Menu 600 or any hidden expert window in another function. In this hidden expert window 1416 the user is verbally able to provide any Number Function command input prior to listening to the prompt of state 1422. If the hidden expert window 1416 times out, VR proceeds to the number prompt, state 1422. Point 1420 which leads to state 1422 is where VR proceeds to from the Call Function when there are no entries in the VR phonebook but Digit Set training has been completed. In state 1422 VR prompts the user by saying, "Say digits one at a time. When finished, say Call or Verify." VR plays a prompt tone 106 then proceeds to block 1424 to wait for user input. If the user does not reply prior to an input time out, VR proceeds to state 1428 to check to see if the previous prompt has been repeated five times. If the prompt has already been repeated five times, the Number Function proceeds to state 120 to exit the VR mode. If the prompt has not been repeated five times, VR returns to state 1422. If the user replies prior to the input timeout in state 1424, VR checks to see if the user input is a command word or a digit.

If the command is "verify", state 1454, VR in state 1458 reads back the number to be dialed. VR then proceeds to point 1410 where VR returns to the hidden expert window 1416.

Figure 4B:
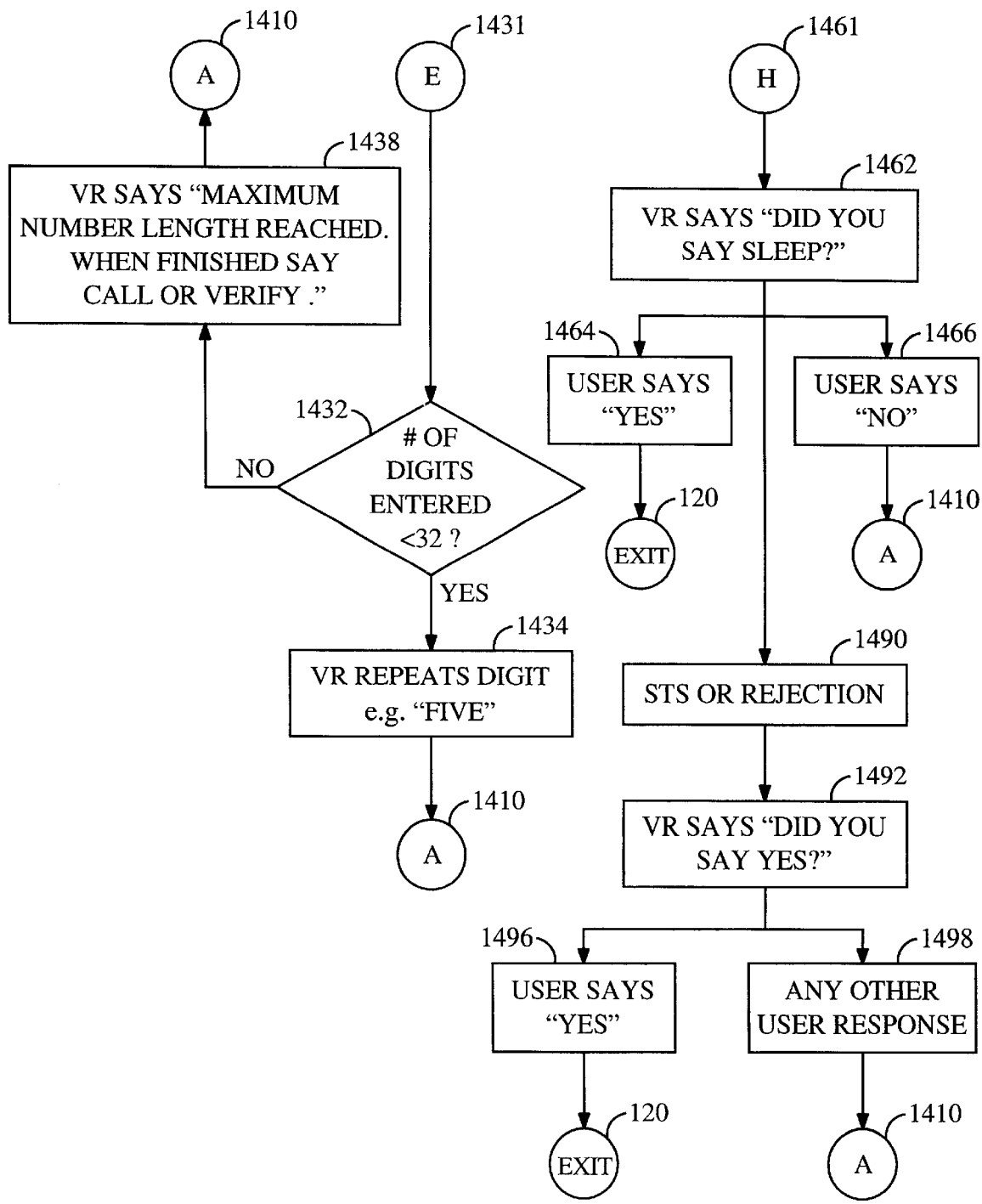

Referring to the bottom of FIG. 4A and to FIG. 4B, if the user says a digit, state 1430, VR checks to see if the maximum number of digits has already been entered, state 1432. If the number of digits already entered is equal to the maximum number of digits, VR in state 1438 says, "Maximum number length reached. When finished say Call or Verify." VR then proceeds to point 1410 to return to the hidden expert window 1416 to await the next user input. If the maximum number of digits has not been entered, VR, in state 1434, repeats the number said by the user. VR then proceeds to point 1410 where VR returns to the hidden expert window 1416 to await further user input.

If the user response to the prompt of state 1422 is "Sleep" state 1460, VR proceeds to state 1462 shown in FIG. 4B and says "Did you say Sleep?" If the user responds "yes" state 1464, VR proceeds to point 120 to exit VR. If the user response is "no" state 1466, VR proceeds to point 1410 to return to the hidden expert window 1416. If the user response is an STS or Rejection state 1490, VR proceeds to state 1492 and says "Did you say yes?" If the user responds to this prompt with "yes" state 1496, VR proceeds to point 120 to exit VR. If the user response is "no" or another STS or Rejection, VR proceeds to point 1410 to return to the hidden expert window 1416.

Figure 4C:
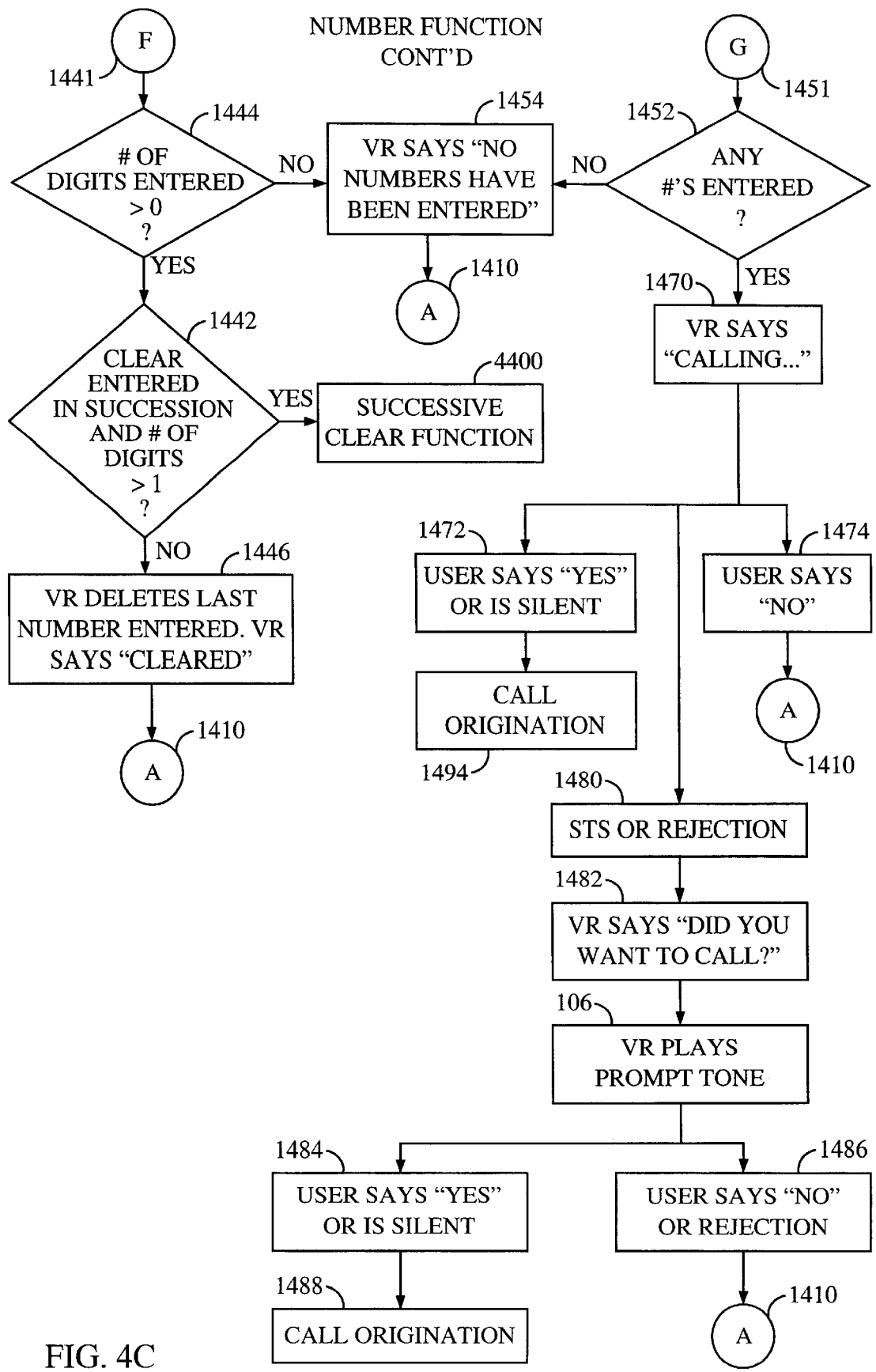

Referring to the bottom of FIG. 4A and to FIG. 4C, if the user command is "Clear" or the user presses the "CLEAR" key, state 1440, VR proceeds to state 1444 to check to see if see if the number of digits entered is greater than zero. If no digits have been entered VR, in state 1454, says, "No numbers have been entered." and proceeds to point 1410 to return to the hidden expert window 1416 (state 1422). If digits have previously been entered, VR proceeds to state 1442 to check if successive clear commands have been issued and the number of digits entered is greater than one. If there have been successive "Clear" commands and the number of digits is greater than one, VR proceeds to the Successive Clear Function 4400 to allow the user to clear the entire entry if desired. If successive "Clear" commands have not been issued or there is only one digit entered, VR proceeds to state 1446 deletes the last number entered, and says "Cleared". VR then returns to point 1410 to await the next user input.

If the user command is "Call" as in state 1450, VR proceeds to state 1452 and checks to see if any numbers have been entered. If no numbers have been entered, VR advances to state 1454 and says, "No numbers have been entered." then returns to point 1420 to return to the prompt for user input. If numbers have been entered state 1470 shows that VR says, "Calling" and repeats the entered number. If the user is silent to the prompt or answers "yes", state 1472, VR advances to state 1494 and originates the call. If the user says "no", state 1474, VR proceeds to point 1410 to return to the hidden expert window 1416. If VR determines the user response is an STS or Rejection, state 1480, VR proceeds to state 1482 and asks, "Did you want to call?" If the user answers "yes" or is silent, state 1484, VR proceeds to state 1488 and originates the call. If the user response is "no" or another Rejection, state 1486, VR proceeds to point 1410 to return to the hidden expert window 1416.

Figure 5:
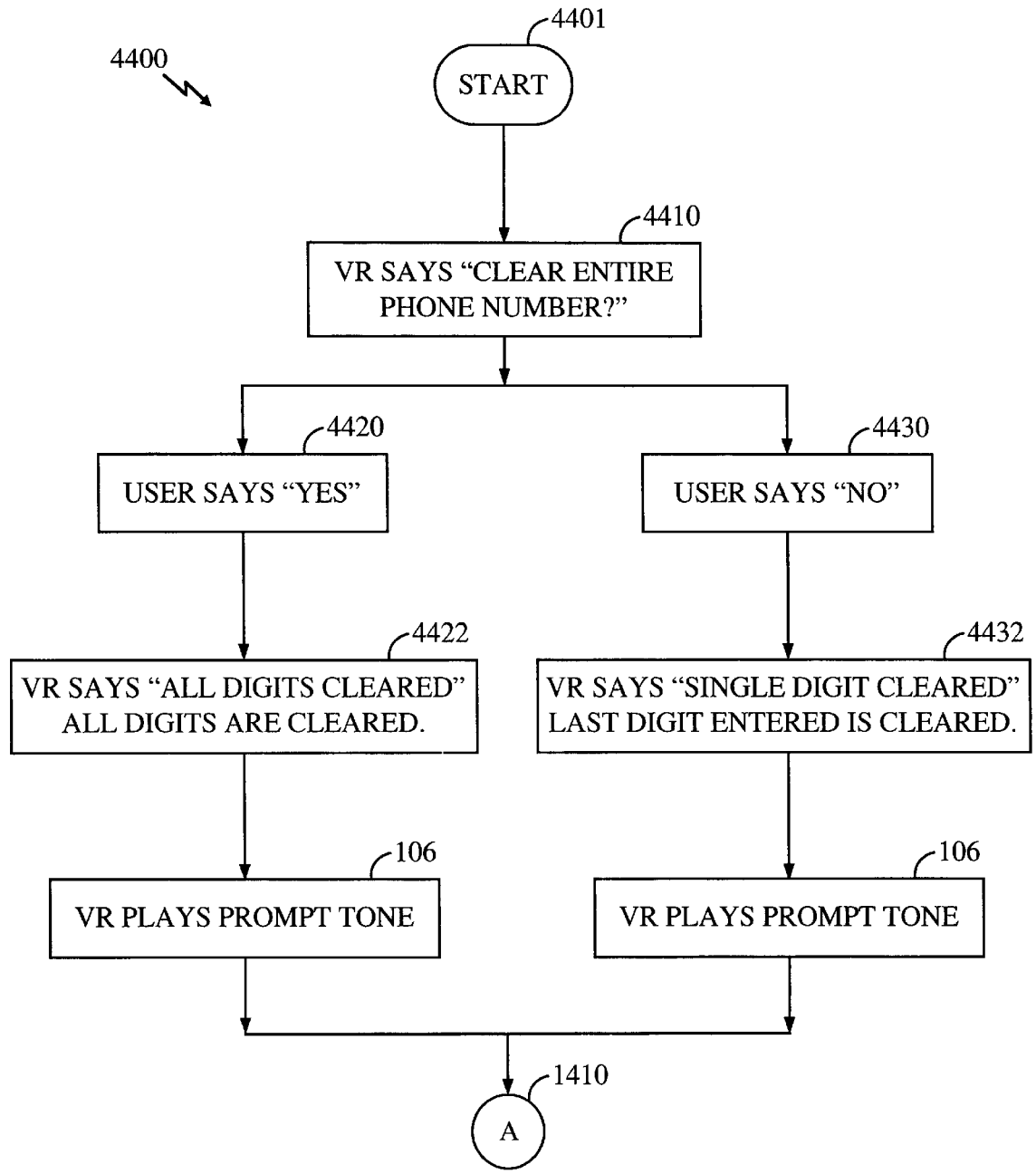
FIG. 5 is a flowchart illustrating the Successive Clear Function that may be used within the Call Function to clear an entered phone number.

As mentioned above, successive "Clear" commands are handled specially to allow the user the option of clearing the entire number. The Successive Clear Function flow chart is illustrated in FIG. 5. Once VR determines that successive "Clear" commands have been input, VR in state 4410 says, "Clear entire phone number?" If the user answers "yes" shown in state 4420, VR says, "All digits cleared", state 4422 and clears all digits currently entered. VR then plays the prompt tone 106. VR then returns to point 1410 to the hidden expert window 1416 within the Number Function 1400.

If, in response to the VR query to clear the entire phone number, the user replies "no", state 4430, VR in state 4432 says, "Single digit cleared" and clears the last digit entered. VR then plays the prompt tone 106. The "Clear" command would have resulted in the clearing of a single digit if the Successive Clear Function did not exist, so the Successive Clear Function defaults to this result. At this point, the flow follows the same path as in the affirmative response path. VR returns to point 1410 to proceed to the hidden expert window 1416 within the Number Function 1400.

Figure 6:
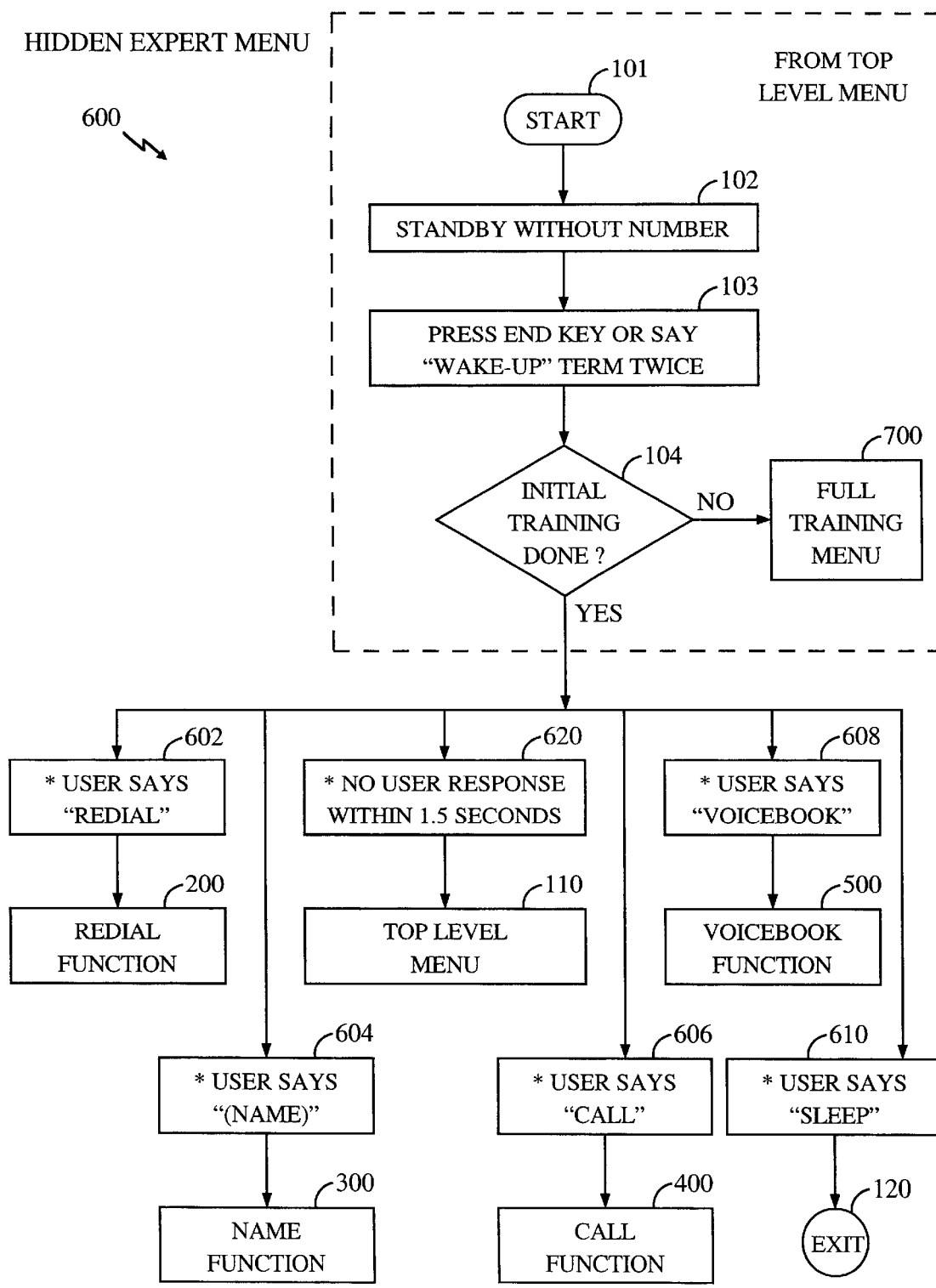
FIG. 6 is a flowchart illustrating the Hidden Expert Menu that resides within the Top Level Function of the present invention.

Referring to FIG. 6, the Hidden Expert Menu 600 is not truly a separate menu since it does not offer additional commands or functionality. Rather, the Hidden Expert Menu 600 allows the user to input commands without having to wait for the VR prompt. From FIG. 3 it can be seen that the flow diagram from the standby mode state 102 through the initial training decision, state 104, is taken from the Top Level Function flow chart of FIG. 1. Once VR determines that initial training has been performed, state 104, the Hidden Expert Menu 600 is available. Under the Hidden Expert Menu 600, the user is able to access any of the top level menu commands prior to hearing a prompt from VR. VR only activates the Hidden Expert Menu 600 for 1.5 seconds. If the user wishes to wait for a prompt, or if the user is unaware of the existence of the Hidden Expert Menu 600, VR proceeds to the top level menu 110 after the 1.5 second response window shown in state 620. The Hidden Expert Menu 600 is to be distinguished from the many hidden expert windows available in the various functions. The hidden expert windows in each of the functions allow for input within the respective function without having to first listen to a user prompt.

Figure 7A:
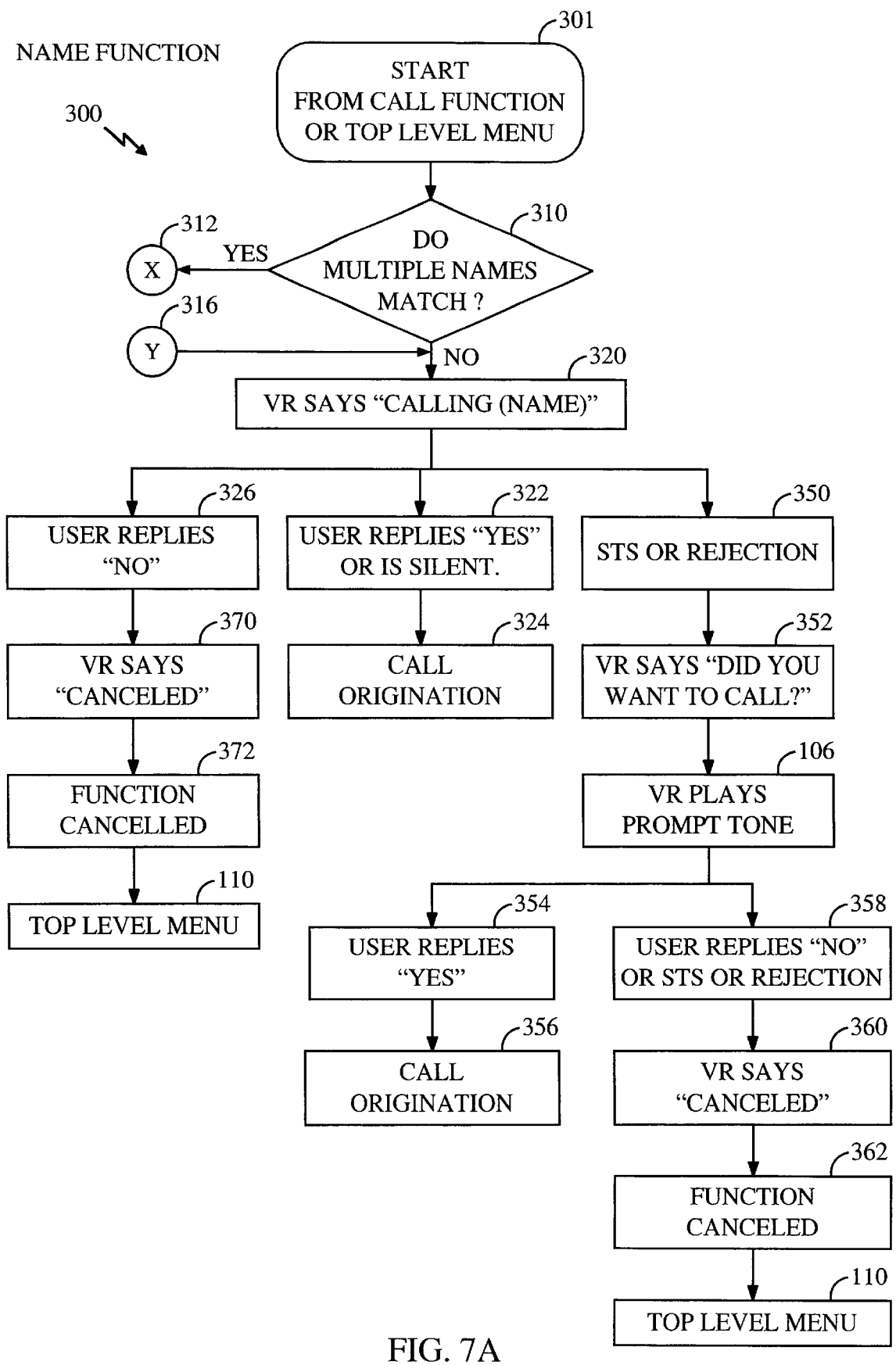
FIG. 7A–7B are flowcharts illustrating the Name Function that provides for call origination by allowing the user to say the name associated with a phone number.

Referring to FIG. 7A, the Name Function 300 is accessed by the user by saying a name of an entry in the VR phonebook. From the Top Level Function 100 or the Call Function 400, a user enters the Name Function 300 after saying a name of an entry in the VR phonebook 301. VR in state 310 checks to see if multiple names provide matches.

Figure 7B:
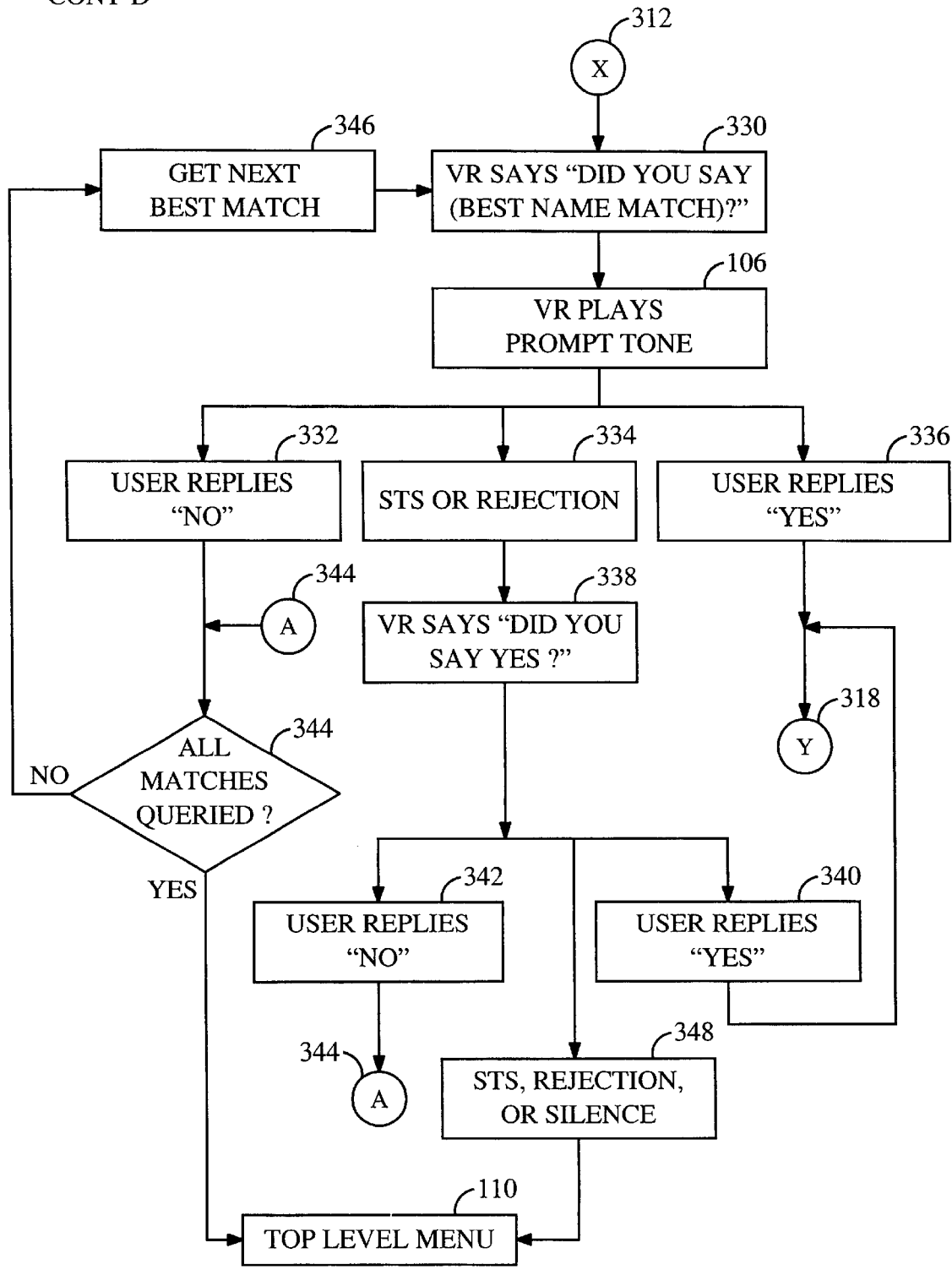

Referring to FIG. 7B, if there are multiple name matches, VR sorts the names to establish the best match. At the next state, 330, VR asks "Did you say (best name match)?" where (best name match) represents the name in the VR phonebook that VR determines provides the best match. VR also plays the prompt tone 106 to signal the user a reply is requested. If the user replies with "no", shown as state 332, VR proceeds to state 344 to see if all matches have been queried. If all matches have not been queried, VR retrieves the next best match in state 346 and repeats the prompt in state 330 with the next best name match. If there are no further names, VR cancels the Name Function 300 and returns to the top level menu 110.

If the user, as shown in state 336, replies "yes" to the prompt of state 330, VR proceeds to state 320 where VR proceeds as if the matching name were the only matching name found. If the user speaks too soon (STS) or if the user response to the query in state 330 is rejected, state 334, VR proceeds to state 338 and asks, "Did you say yes?" VR next plays the prompt tone 106. If the user responds to the query of state 338 with "no" as shown in state 342, VR advances to state 344 to process the response as in state 332 for an initial "no" answer. If the user replies "yes", VR proceeds to state 320. For any other response, or if the user does not respond within a time out, state 348, VR exits the Name Function 300 to the top level menu 110.

Referring back to FIG. 7A, once VR determines that there is one matching name, VR proceeds to state 320 and says, "Calling (name)" where (name) represents the matching name in the VR phonebook. VR then waits 1.5 seconds for a user response. If the user is silent or responds "yes", state 322, VR originates the call in state 324. VR interprets the silence as an implied yes. If the user responds "no", shown as state 326, VR in state 370 says "Cancelled." VR then cancels the Name Function 300 in state 372 and returns to the top level menu 110. If the user response is an STS or Rejection, shown as state 350, VR, in state 352, asks the user "Did you want to call?" VR then plays the prompt tone 106. If the user replies "yes", state 354, VR originates the call in state 356. If the user replies "no" or the response is an STS or Rejection, state 358, VR in state 360 says "Cancelled." The Name Function 300 is cancelled in state 362 and VR returns to the top level menu 110.

Figure 8:
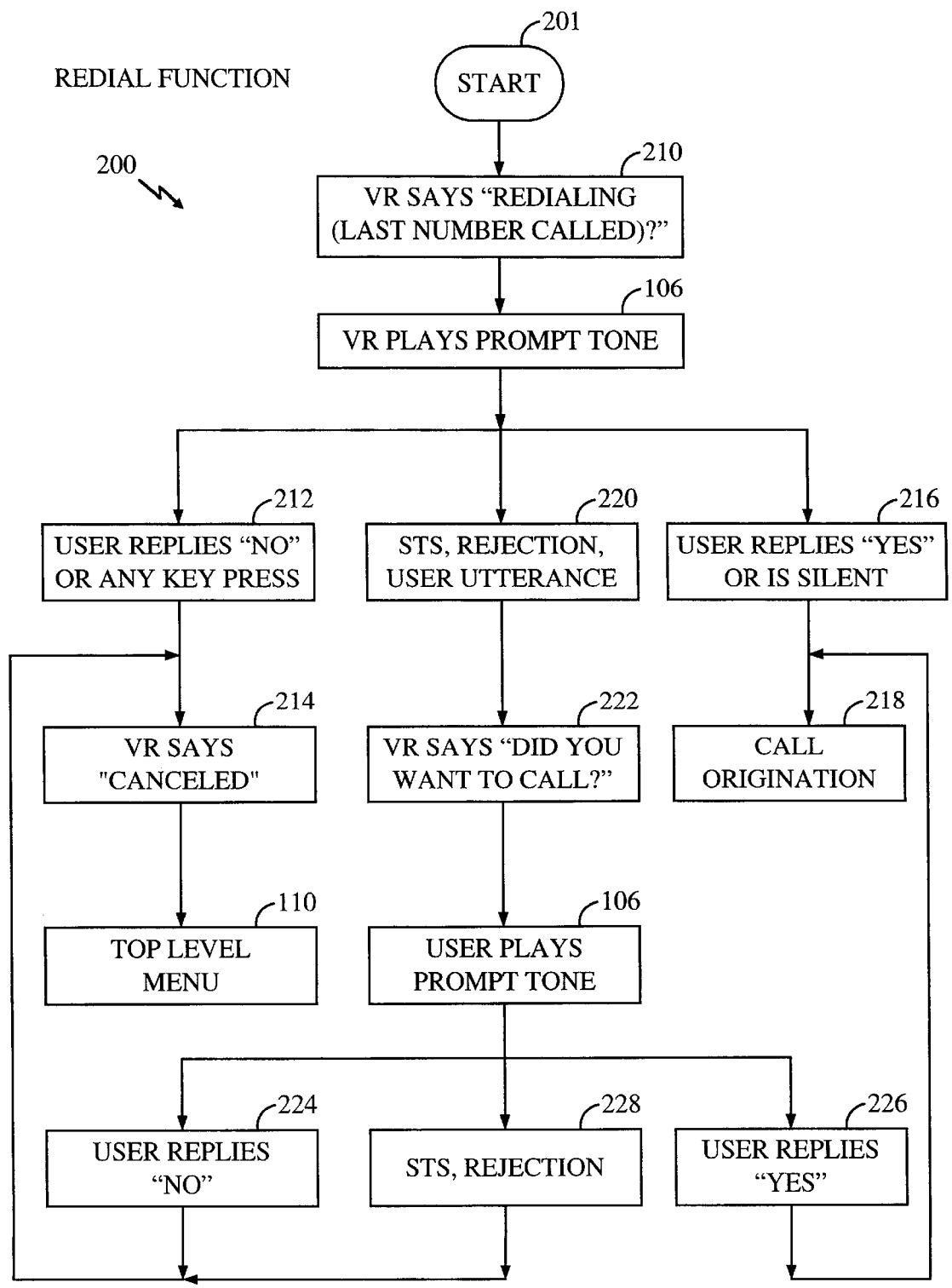
FIG. 8 is a flowchart illustrating the Redial Function that allows the user to redial the last number called by saying, "Redial"

Referring to FIG. 8, the user is able to access the Redial Function 200 from the Top Level Function 100. The Redial Function allows a user to redial the last number called. From the top level menu 110, the user enters the Redial Function 200 by saying "redial." After entering the Redial Function 200, VR in state 210 prompts the user by saying, "Redialing (last number called)", where (last number called) represents the last number called by the handset. VR additionally plays the prompt tone 106 to indicate to the user a reply is requested. If the user replies "no" or presses any key on the keypad, state 212, VR says "Cancelled" state 214. VR cancels the Redial Function and returns to the top level menu 110. If the user replies "yes" or is silent, state 216, VR originates the call, state 218. If VR detects a STS response or if the user response is rejected, state 220, VR proceeds to state 222 and asks the user "Did you want to call?" VR then plays the prompt tone 106. A user "no" reply, state 224, causes VR to proceed to state 214 where VR says, "Cancelled" and cancels the Redial Function. VR then returns to the top level menu 110. If the user replies "yes" or is silent, state 226, VR originates the call in state 218. Another STS or Rejection, state 228, causes VR to proceed to state 214 where VR says, "Cancelled" and cancels the Redial Function. VR then returns to the top level menu 110.

Figure 9A:
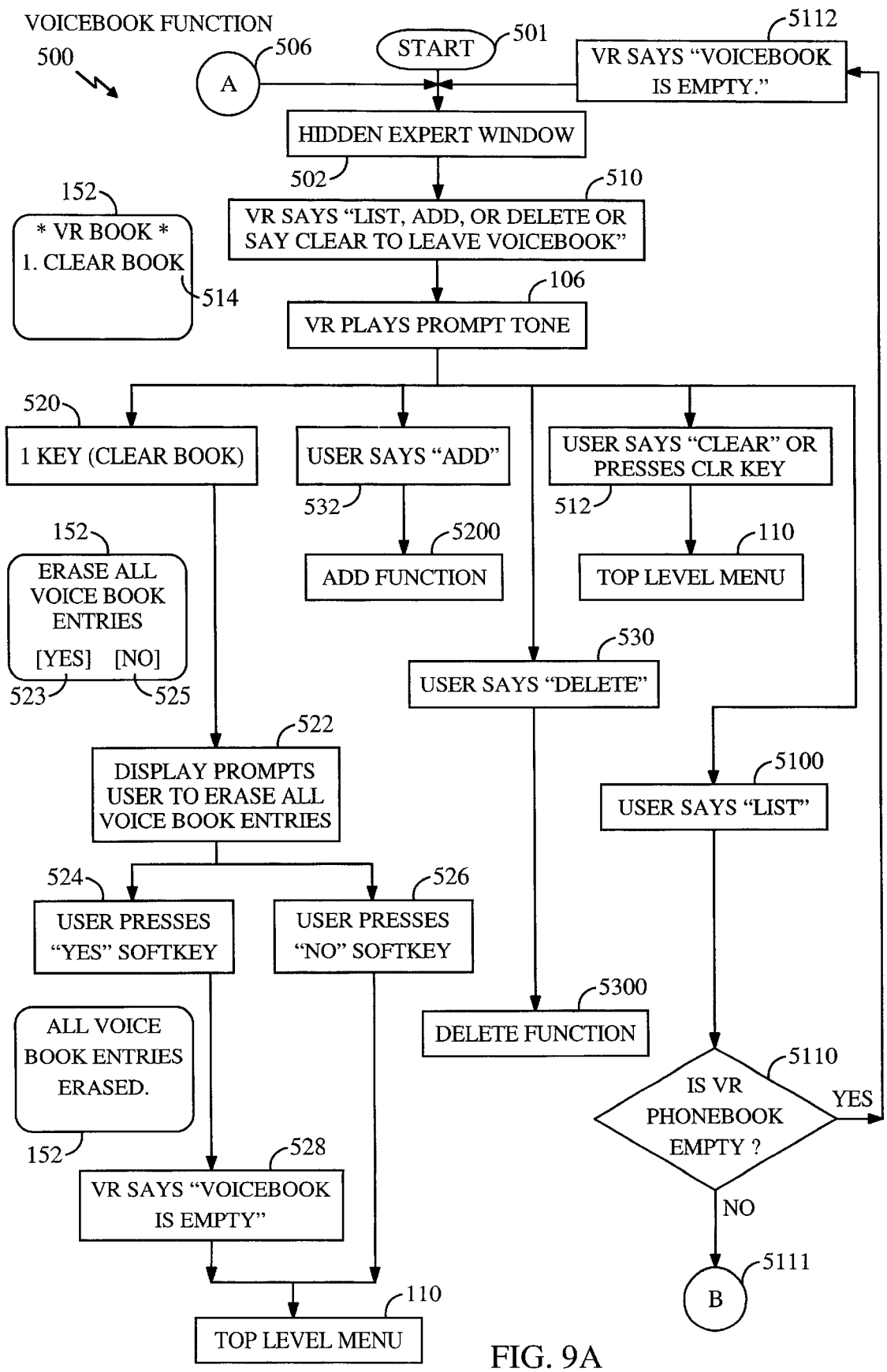
FIG. 9A–9B are flowcharts illustrating the Voicebook Function, which allows a user to edit a voicebook of phone number entries.

Referring to FIG. 9A, the user is able to access the Voicebook Function 500 from the Top Level Function 100.

The Voicebook Function 500 allows the user to add and delete entries in the VR phonebook as well as command VR to read the entries in the VR phonebook. The latter feature allows the user to browse through the VR phonebook in a hands free manner. From the top level menu 110, the user enters the Voicebook Function 500 by saying, "Voicebook." Once the user enters the Voicebook Function 500, a hidden expert window 502 is available to the user for about 1.5 seconds. The hidden expert window 502 is different and separate from the Hidden Expert Menu 600 available at the Top Level Function 100. This f hidden expert window 502 is only active in the Voicebook Function 500 and allows the user to access all voicebook commands without waiting for a user prompt. If the user does not respond within the time frame of the hidden expert window 502, VR proceeds to the voicebook user prompt 510. At the voicebook user prompt 510, VR says, "List, Add, or Delete or say Clear to leave voicebook." Then VR plays the prompt tone 106. Additionally, the phone displays a "clear book" keypad option 514.

If the user depresses the key corresponding to the "clear book" option, state 520, the VR advances to state 522 and controls the handset display to show a query asking the user to "Erase ALL Voice Book entries?" Softkeys 523 and 525 representing "yes" and "no " are available to the user. If the user chooses the "yes" softkey, state 524, the handset display 152 shows "ALL Voice Book Entries erased." VR then proceeds to state 528 and says, "Voice Book is empty." VR then returns to the top level menu 110. If the user chooses the "no" softkey, state 526, VR cancels the Voicebook Function and returns to the top level menu 110.

If the user says, "Clear" or depresses the CLR key, state 512, in response to the voicebook user prompt, VR cancels the Voicebook Function and returns to the top level menu 110. A user response of "Add", state 532, will cause VR to initiate the Add Function 5200. Likewise, a user response of "Delete", state 530, will cause VR to initiate the Delete Function 5300.

If the user says, "List", state 5100, in response to the voicebook user prompt 510, VR first checks to see if the VR phonebook is empty, state 5110. If the VR phonebook is empty, VR in state 5112 says, "Voice Book is empty" and returns to the hidden expert window 502.

Figure 9B:
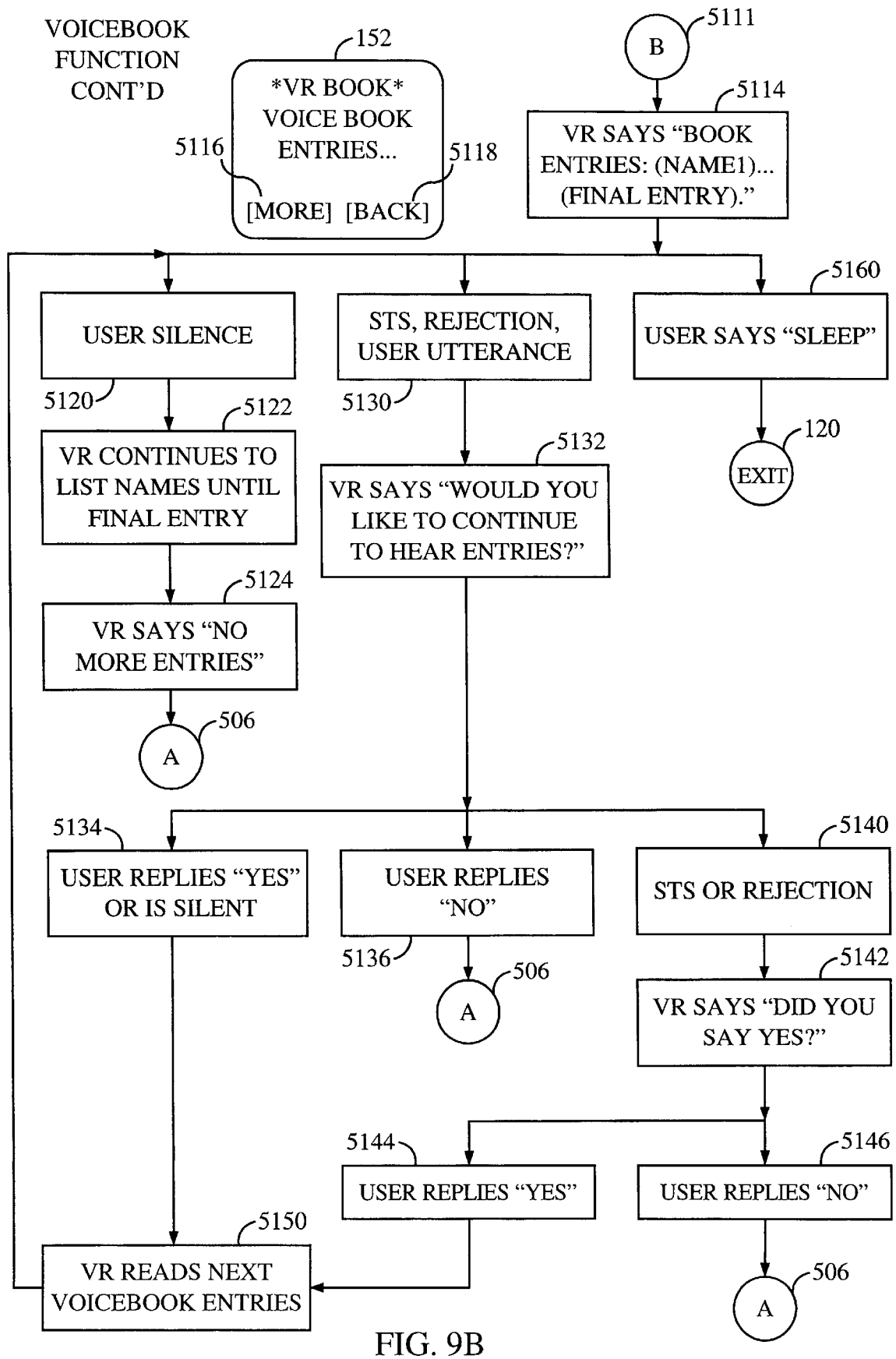

Referring to FIG. 9B, if the VR phonebook is not empty, VR in state 5114 says "Book entries: (name1) . . . (final entry)" where (name1) represents the first name in the VR phonebook and (final entry) represents the last name in the VR phonebook. Additionally, the handset display 152 provides softkeys representing "More" 5116 and "Back" 5118. If the user depresses the "More" softkey 5116, VR will advance to and read the next name. If the user depresses the "Back" softkey 5118, VR will begin reading the names from the first entry. Provided the user remains silent, state 5120, VR will proceed to state 5122 and continue to list names from the VR phonebook through to the final entry. Once VR has read the final entry, state 5124, VR says, "No more entries" and returns to the point prior to the hidden expert window 502.

If, while VR is listing the voicebook entries, VR detects a STS, VR user input Rejection, or the user speaks, state 5130, VR proceeds to state 5132 and asks, "Would you like to continue to hear entries?" If the user replies "yes" or is silent, state 5134, VR reads the next voicebook entries. If the user replies "no", state 5136, VR returns to the point 506 just prior to the hidden expert window. If VR detects another STS or Rejection, state 5140, VR in state 5142 asks, "Did you say yes?" If the user now replies "yes", state 5144, VR reads the next voicebook entries, state 5150. If the user replies "no", state 5146, VR returns to the point 506 just prior to the hidden expert window 502.

If, in between voicebook listings, the user responds with the command "Sleep", state 5160, VR advances to state 120 to exit back to standby mode 102.

Figure 10A:
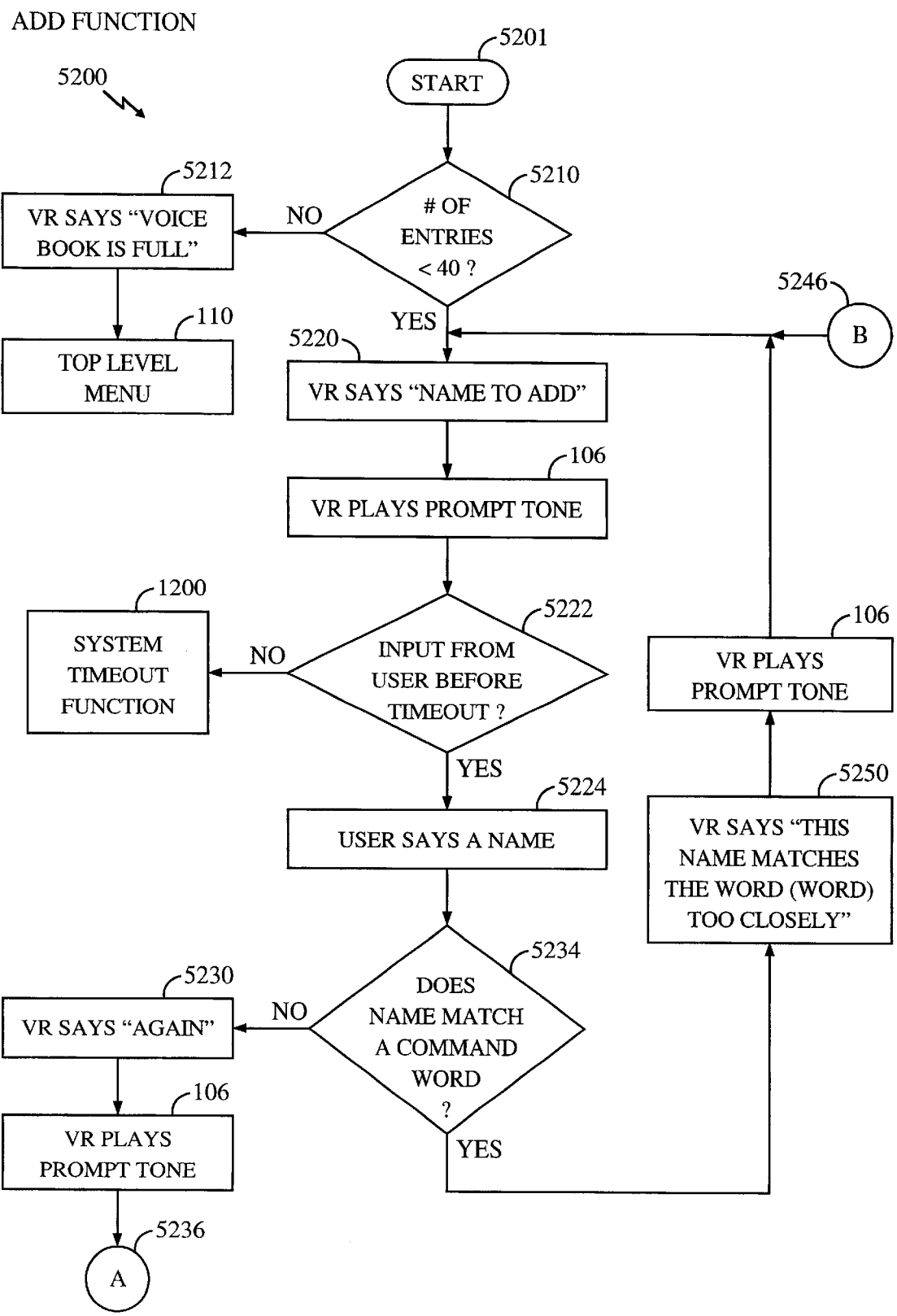
FIG. 10A–10C are flowcharts of the Add Function available within the Voicebook Function, which allows the user to add names and phone numbers to the VR voicebook.

Referring to FIG. 10A, the user can enter the Add Function by saying, "Add" at the Voicebook Function user prompt 510. When first entering the Add Function, VR checks to see if the maximum number of entries already exists, state 5210. If the maximum number of entries exist, VR proceeds to state 5212 and says, "Voice Book is full." Then VR exits the Add Function 5200 and returns to the top level menu 110.

If there is available space in the voicebook, VR proceeds to state 5220 and says, "Name to add." VR then plays the prompt tone 106. After the prompt, VR waits for user input at state 5222. If there is no user input prior to timeout, VR initiates the system timeout routine 1200. If the user speaks a name prior to timeout, state 5224, VR checks to see if the name matches a command word in state 5234. VR does not allow a user to save a name that matches a command word because of resultant ambiguity in processing of the word. If the name matches a command word, in state 5250 VR says, "This name matches the word: (word) too closely." where (word) represents the command word that VR determines matches the name that the user wishes to add. VR will also play the prompt tone 106 to indicate to the user that a response is required. VR then returns to state 5220 to prompt for a new user response.

Figure 10B:
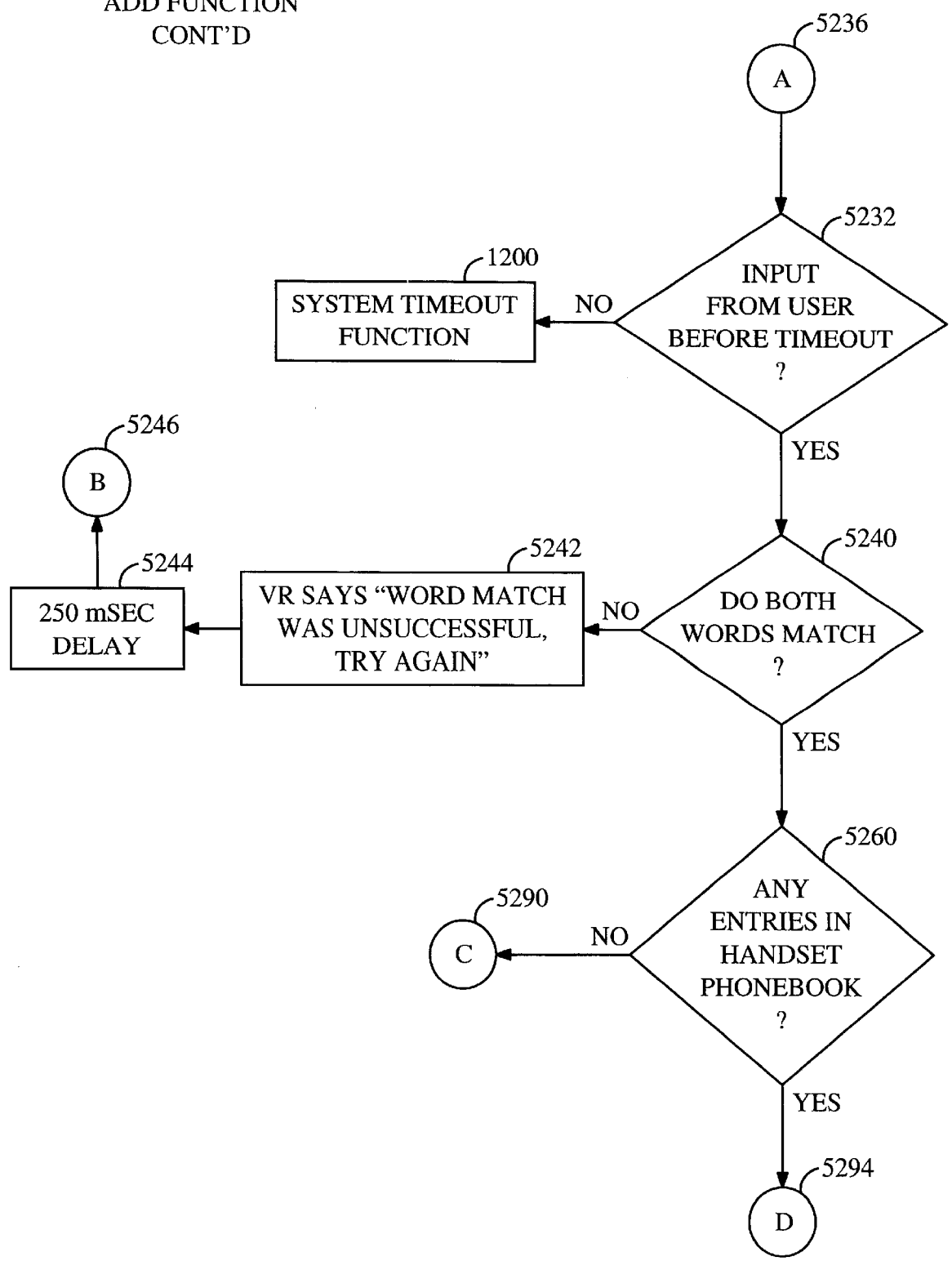

Once a satisfactory name has been input, VR prompts the user to repeat the name in state 5230 by saying, "Again." VR also plays the prompt tone 106. Referring to FIG. 10B, VR then waits for the user to repeat the name in state 5232. VR initiates the system timeout routine 1200 if the user does not reply prior to timeout.

Even if the name does not match any command words, the two user utterances still must match each other. VR checks in state 5240 the two user utterances of the name match. If the two utterances do not match VR proceeds to state 5242 and says, "Word Match was unsuccessful, try again." VR then returns to state 5220 to prompt the user for a new name. If the two user utterances do match, VR allows the user to enter a phone number corresponding to the name.

VR allows the phone number to be entered using the keypad or the phone number may be copied from numbers stored in the handset phonebook. Before giving the user the option of copying a number from the handset phonebook, VR in state 5260 checks to see if there are any numbers stored in the handset phonebook.

Figure 10C:
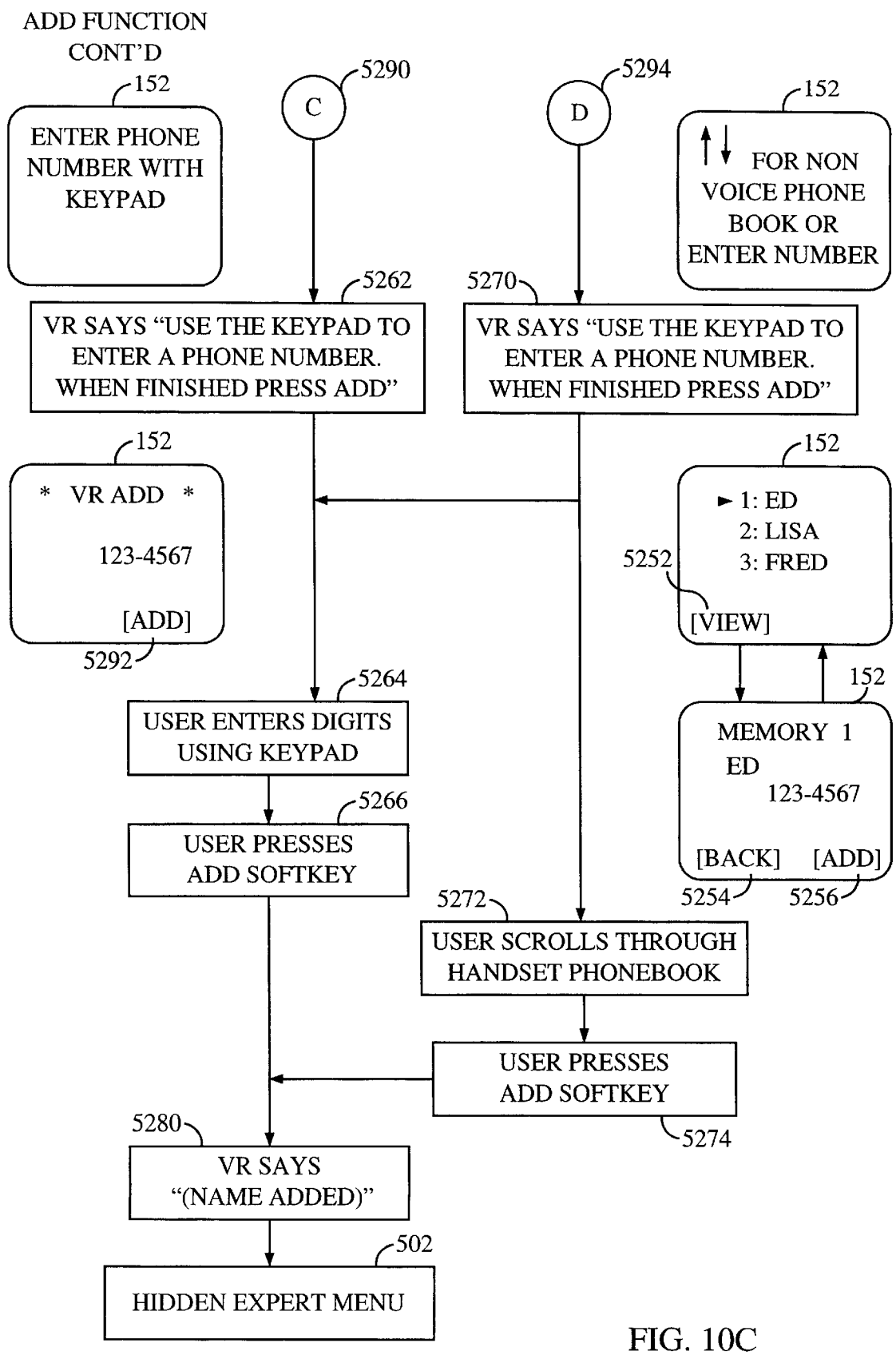

Referring to FIG. 10C, if there are no numbers stored in the handset phonebook, VR proceeds to state 5262 and says, "Use the keypad to enter a phone number. When finished, press add." At this point, the user is only allowed to use the keypad to enter the phone number. As the user enters the phone number, the numbers entered are shown on the handset display 152. Additionally, the handset display shows the availability of an "ADD" softkey 5292. Once the user has entered the phone number, the user must press the "ADD" softkey 5292 to save the entry in the voicebook. After the user presses the "ADD" softkey 5292 VR proceeds to state 5280 and says, "(name) added" where (name) corresponds to the user utterances from the prior prompts. VR then returns to the hidden expert window 502 within the Voicebook Function 500.

If at state 5260 VR determines that there are entries in the handset phonebook VR proceeds to state 5270 and says, "Use the keypad to enter a phone number. When finished, press add." Note that this is the same voice prompt as in the case where there are no entries in the handset phonebook. However, the handset display 152 allows the user to scroll through the entries in the handset phonebook. If the user chooses to enter a phone number using keypad presses, VR proceeds according to state 5264. However, the user can choose to scroll through the handset phonebook, state 5272, and display the corresponding phone numbers. Once the user has identified an entry in the handset phonebook, the user can press the [VIEW] softkey 5252 to display the corresponding phone number. If the entry is not the one the user wishes to add, the user can press the [BACK] softkey 5254 to return to the previous handset phonebook display 152. The user can choose to add the phone number from the handset phonebook to the VR phonebook when in the VIEW display 152 by pressing the [ADD] softkey 5256. Once the user has pressed the [ADD] softkey 5256, VR proceeds to 5280 and says, "(name) added." VR then returns to the hidden expert window 502 within the Voicebook Function 500.

Figure 11A:
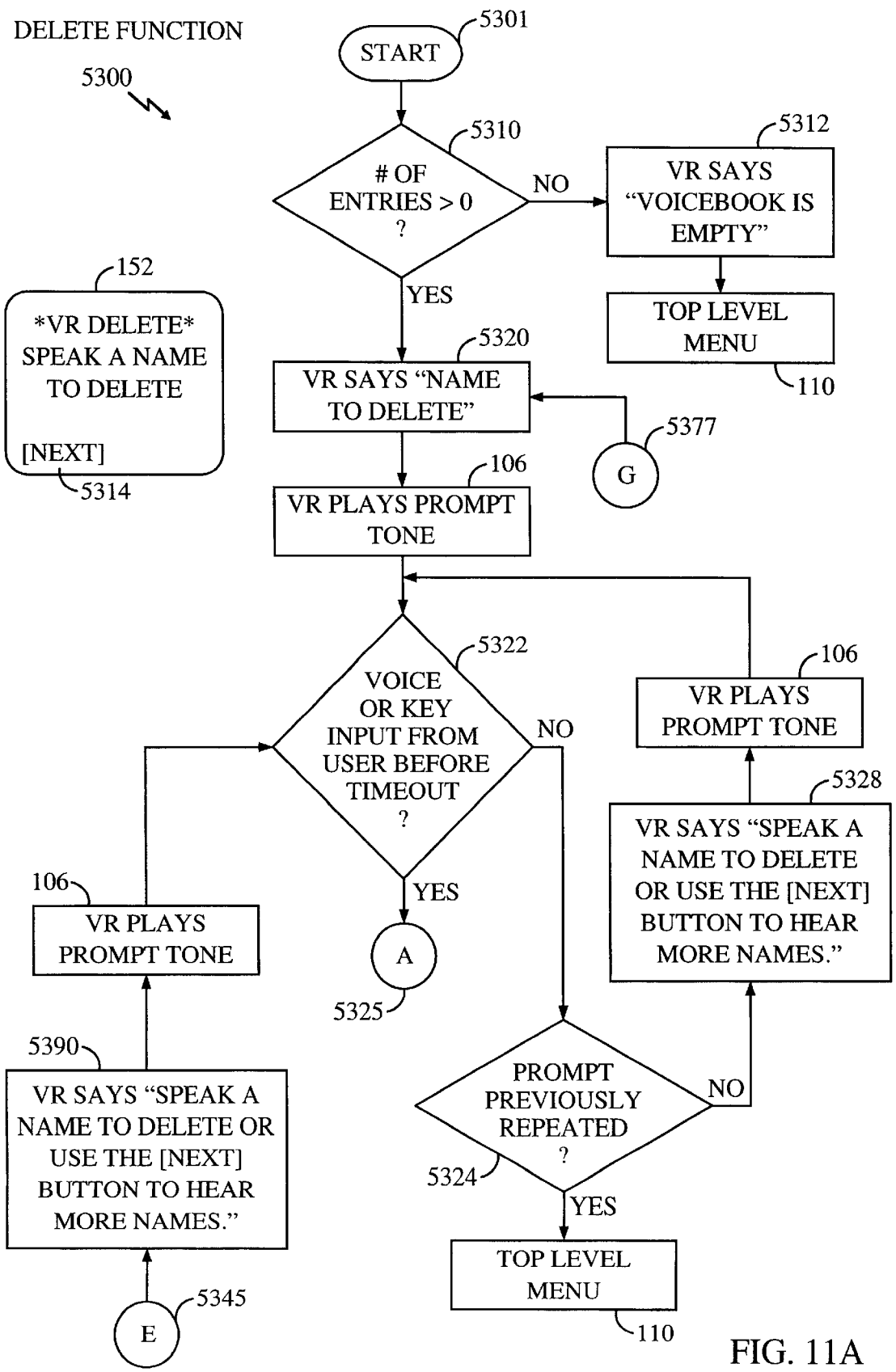
FIG. 11A–11C are flowcharts of the Delete Function available within the Voicebook Function, which allows the user to delete names and phone numbers within the VR voicebook.

Referring to FIG. 11A, the user is similarly allowed to delete entries from the VR phonebook. The user enters the Delete Function 5300 by saying, "Delete" at the Voicebook Function user prompt 510. Upon entry into the Delete Function, VR first checks to see that the VR phonebook is not already empty, state 5310. If the VR phonebook is already empty, there are no entries to delete. VR in state 5312 says, "Voice book is empty." VR then returns to the top level menu 110. If there are entries in the VR phonebook, VR moves to state 5320 and says, "Name to delete." VR then plays the prompt tone 106. VR waits for user voice or key input at state 5322. If there is no user input and the system times out, VR proceeds to state 5324 where VR checks to see if the prompt has already been repeated. If the prompt has not yet been repeated, VR proceeds to state 5328 and says, "Speak a name to delete or use the [NEXT] button to hear more names." VR also plays the prompt tone 106. VR then returns to block 5322 to await user input. If the system times out a second time, VR cancels the Delete Function and returns to the top level menu 110.

The user can respond to the previous prompt by either speaking a name or pressing the [NEXT] softkey 5314. If the user presses the [NEXT] softkey 5314, as shown in state 5380, VR advances to state 5332 which is described below in reference to FIG. 11C.

Figure 11B:
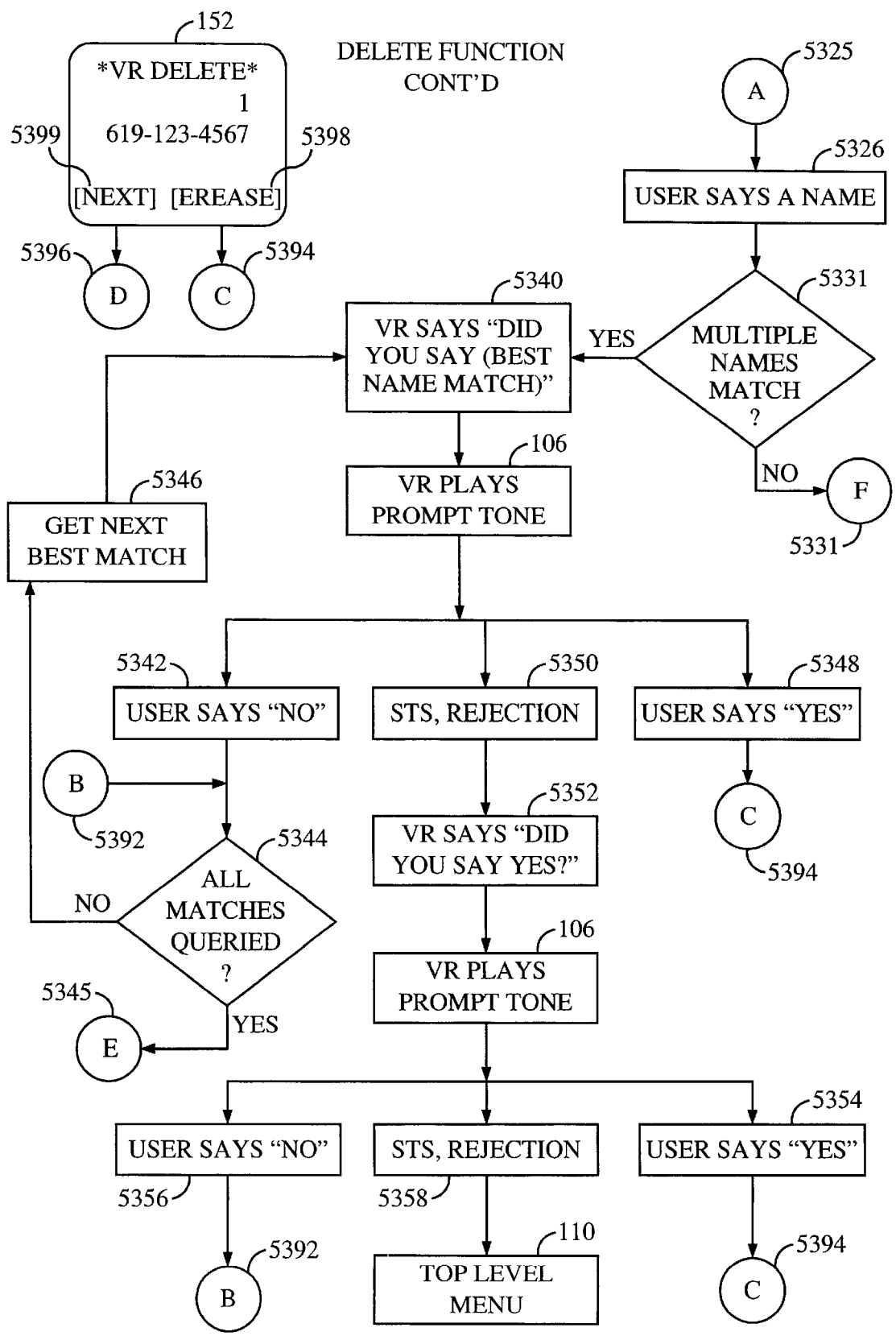

Referring to FIG. 11B, if the user says a name as shown in state 5326, VR proceeds to state 5330 and checks to see if multiple names match. When there are multiple name matches, VR processes the multiple matches in much the same way that VR handles multiple name matches in the Name Function 300. If multiple names match, VR in state 5340 says, "Did you say (best name match)?" where (best name match) represents the name in the VR phonebook that VR determines provides the best match. VR also plays the prompt tone 106 to signal the user a reply is requested. The user replies "no", as shown in state 5342, if the queried name is not the one spoken by the user. VR then proceeds to state 5344 to see if all possible matches have been queried. If not all name matches have been queried, VR retrieves the next best name match in state 5346 then returns to state 5340 to repeat the prompt with the next best name match. However, if there are no further names, VR proceeds to state 5390 (see FIG. 11A) and says, "Speak a name to delete or use the [NEXT] button to hear more names." VR plays the prompt tone 106 to indicate to the user input is required. VR then returns to state 5322 to await user input. The user replies "yes", as shown in state 5348, if the queried name matches the name spoken by the user. VR then advances to point 5394 where VR proceeds to state 5372 and says "(name) deleted." Following state 5372, VR returns to the Hidden Expert Window 502 in the Voicebook Function 500.

As shown in state 5350, if the user speaks too soon (STS) or if the user response to the query in block 5340 is rejected, VR proceeds to state 5352 and asks, "Did you say yes?" VR plays the prompt tone 106 to indicate user input is required. If the user responds with "no", state 5356, VR proceeds to point 5392 to process the response as in block 5342 for an initial "no" answer. If the user replies "yes", VR processes the response as in state 5348 for an initial "yes" answer by advancing to point 5394. For any other response, as shown in state 5358, VR cancels the Delete Function and returns to the top level menu 110.

Figure 11C:
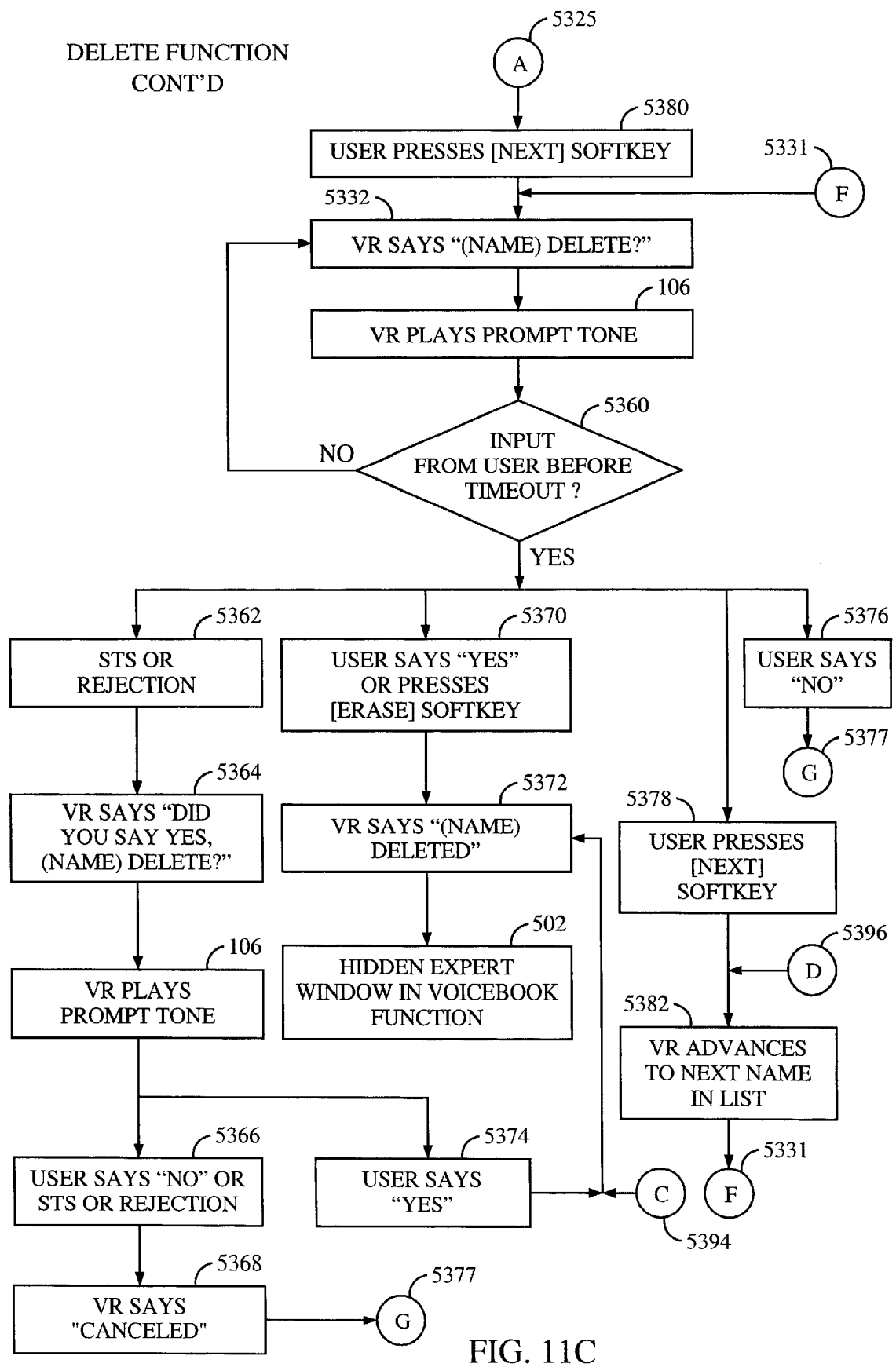

Referring to FIG. 11C, if VR determines that only a single name from the VR phonebook matches the input from the user or if the user presses the [NEXT] softkey VR proceeds to state 5332 and says, "(name) Delete?" where (name) corresponds to the name from the VR phonebook that VR determines is a match. VR also plays the prompt tone 106 to inform the user a reply is required. VR then waits for the user input in state 5360. If there is no user response and VR times out, VR returns to state 5332 to repeat the prompt. If the user reply is "yes" or if the user depresses the [ERASE] softkey 5398, as shown in state 5370, VR proceeds to state 5372 and says, "(name) deleted." VR then returns to the hidden expert window 502 in the Voicebook Function 500. If the user reply is "no", as shown in state 5376, VR returns to state 5320 (FIG. 11A) to prompt the user for a name to delete. If the user presses the [NEXT] softkey 5399, shown as state 5378, VR proceeds to state 5382 to retrieve the next name from the VR phonebook. VR then returns to state 5332 to prompt the user with the next name in the VR phonebook. If the user response is an STS or Rejection, shown as state 5362, VR proceeds to state 5364 and says, "Did you say yes, (name) delete?" VR then plays the prompt tone 106. If the user response to this query is "yes", state 5374, VR proceeds to block 5372 to delete the entry using the same process as if the user had answered yes in state 5370. If the user response is "no" or another STS or Rejection, state 5366, VR proceeds to state 5368, says "Cancelled" and returns to block 5320 to prompt the user for a name to delete.

Referring to FIG. 12A, the Train Function is accessible to the user only by pressing the "TRAIN" softkey 150 at the Top Level Function 100. The Train Function 900 operates only in response to user keypad presses because access to training via voice commands would be impossible without having first performed training. Once the user has entered the Train Function 900, VR proceeds to state 902 where the handset displays 152 two vocabulary sets that the user can choose to train, the Basic Set 906 and the Digit Set 908. The Basic Set is made up of command words including; call, redial, yes, no, add, delete, voicebook, sleep, wake-up, clear, list, and answer. The Digit Set is made up of keypad and dialing related words including, zero, one, two, three, four, five, six, seven, eight, nine, oh, star, pound, verify, and number. Whether the user chooses the Basic Set, state 910, or the Digit Set, state 920, the user is given the option of performing full training or retraining. The handset display 152 displays the Train option 942 and the Retrain option 944. The handset also displays a [QUIT] softkey 946. If the user chooses to Train the vocabulary set, state 914, VR initializes full training 700. If the user only chooses to Retrain the vocabulary set, state 916, VR initializes the Retrain Function 800. The user may decide not to perform training by choosing the [QUIT] softkey 946. This choice is shown as state 924. If the user presses the [QUIT] softkey 946, VR advances to point 120 and proceeds to exit VR back to standby 102.

Referring to FIG. 12B, the user is also able to erase all voice commands and VR phonebook entries by pressing and holding the "0" key, state 930. This choice is hidden and not shown on the handset display. If the user presses and holds the "0" key, VR proceeds to state 932 where the handset displays 950 "ERASE Voice Commands & BOOK entries" and provides "yes" and "no" softkey choices, 952 and 954. If the user presses the "yes" softkey, state 936, VR proceeds to state 938 where it erases all VR command words and all VR phonebook entries. VR then advances to point 120 to exit voice recognition mode. If the user presses the "no" softkey, state 934, VR advances to point 120 and exits the voice recognition mode without altering any of the contents.

Figure 13A:
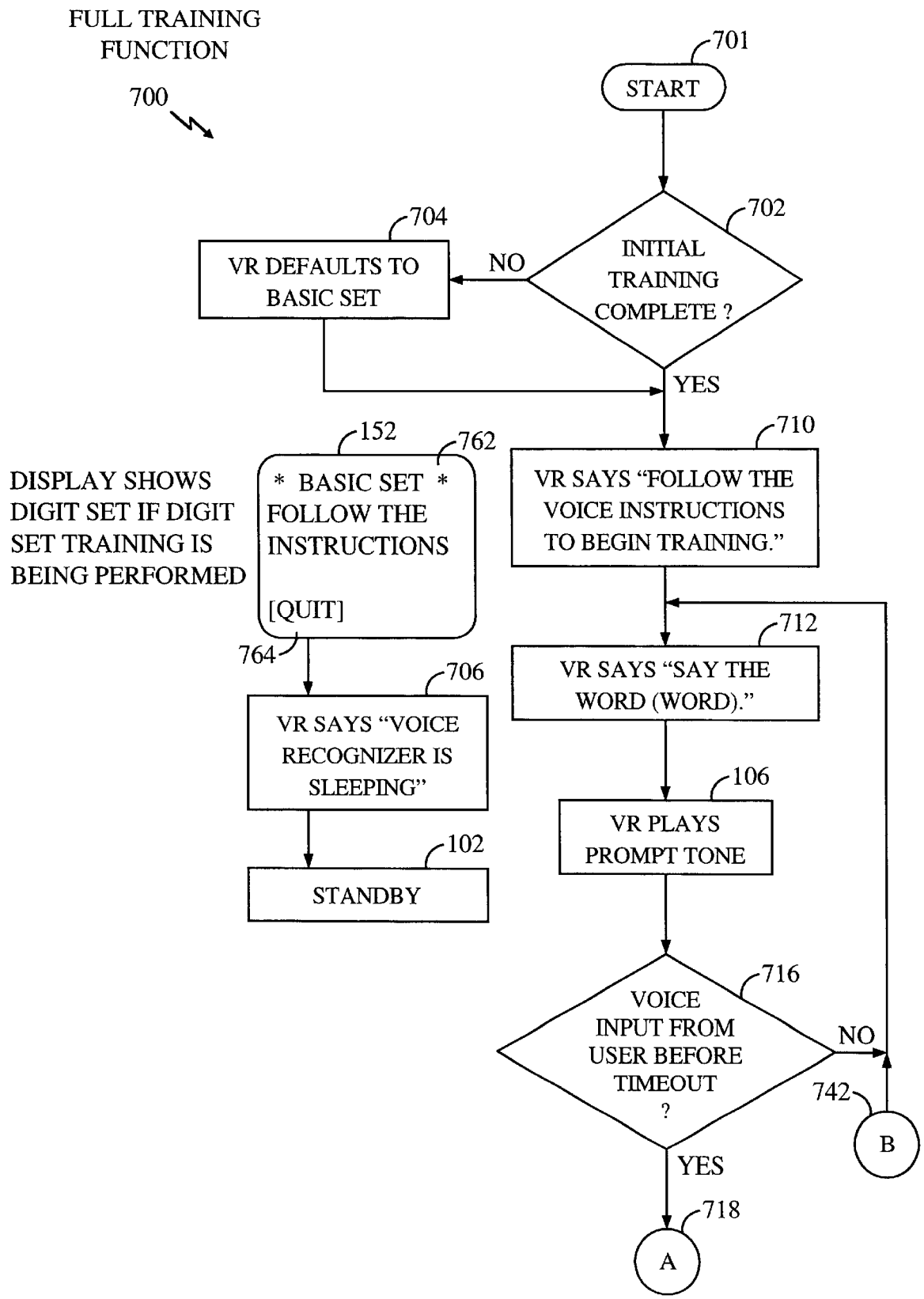
FIG. 13A–13B are flowcharts illustrating the Full Training Function which must be performed to access full functionality of the voice recognition user interface.

Referring to FIG. 13A, the Full Training Function 700 is accessed through the Train Function 900 or automatically upon entering VR if no training has yet been performed (See FIG. 1, 104). In the Full Training Function 700, VR first checks to see if initial training has been completed, state 702. If initial training has not yet been performed, VR defaults to train the Basic Set, state 704. The handset display 152 shows "BASIC SET" as the header 762. If the Full Training Function 700 is entered from the Train Function 900, the vocabulary set chosen in the Train Function 900 is displayed as a header 762 on the handset display 152. The handset display 152 also displays a [QUIT] softkey 764. If the user chooses the [QUIT] softkey 764, VR in state 706 says, "Voice Recognizer is sleeping." VR then exits the voice recognition mode to standby 102.

VR says, "Follow the voice instructions to begin training" in state 710 after the vocabulary set has been determined. VR in state 712 next says, "Say the word (word)" where (word) represents the first word in the vocabulary set being trained. VR plays the prompt tone 106 to inform the user a response is required. VR then waits for user input in state 716. If the system times out prior to user input, VR returns to state 712 to repeat the prompt.

Figure 13B:
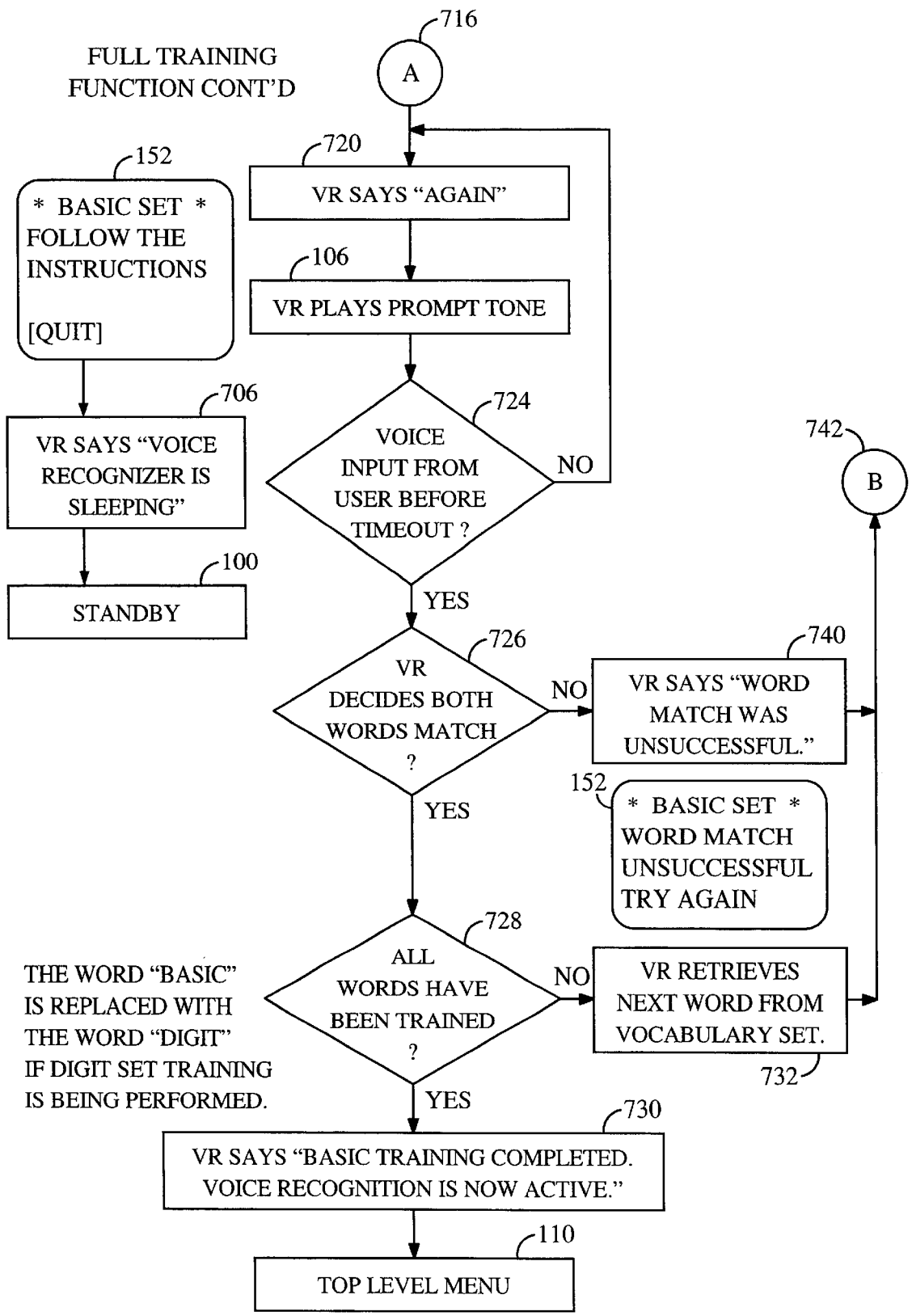

Referring to FIG. 13B, if the user responds to the prompt, VR requests the user repeat the word. VR in state 720 says, "Again." VR then plays the prompt tone 106. VR waits in state 724 for the user to repeat the word. If VR times out prior to user input, VR returns to state 720 to repeat the "Again" prompt. If the user responds, VR in state 726 compares both user utterances to see if they match. If the two utterances do not match VR in state 740 says, "Word match was unsuccessful." VR then returns to state 712 to repeat the training routine for the same word. If VR decides that both utterances match, VR saves the word in memory then in state 728 checks to see if all words in the vocabulary set have been trained. If not all words in the vocabulary set have been trained, VR retrieves the next word in the vocabulary set, state 732. VR then returns to state 712 and repeats the training routine for the next word in the vocabulary set. Once all words in the vocabulary set have been trained, VR proceeds to state 730 and says, "(vocabulary set) training completed. Voice Recognition is now active." The term (vocabulary set) corresponds to the current vocabulary set, Basic or Digit, that is currently being trained. VR then returns to the top level menu 110.

Figure 14A:
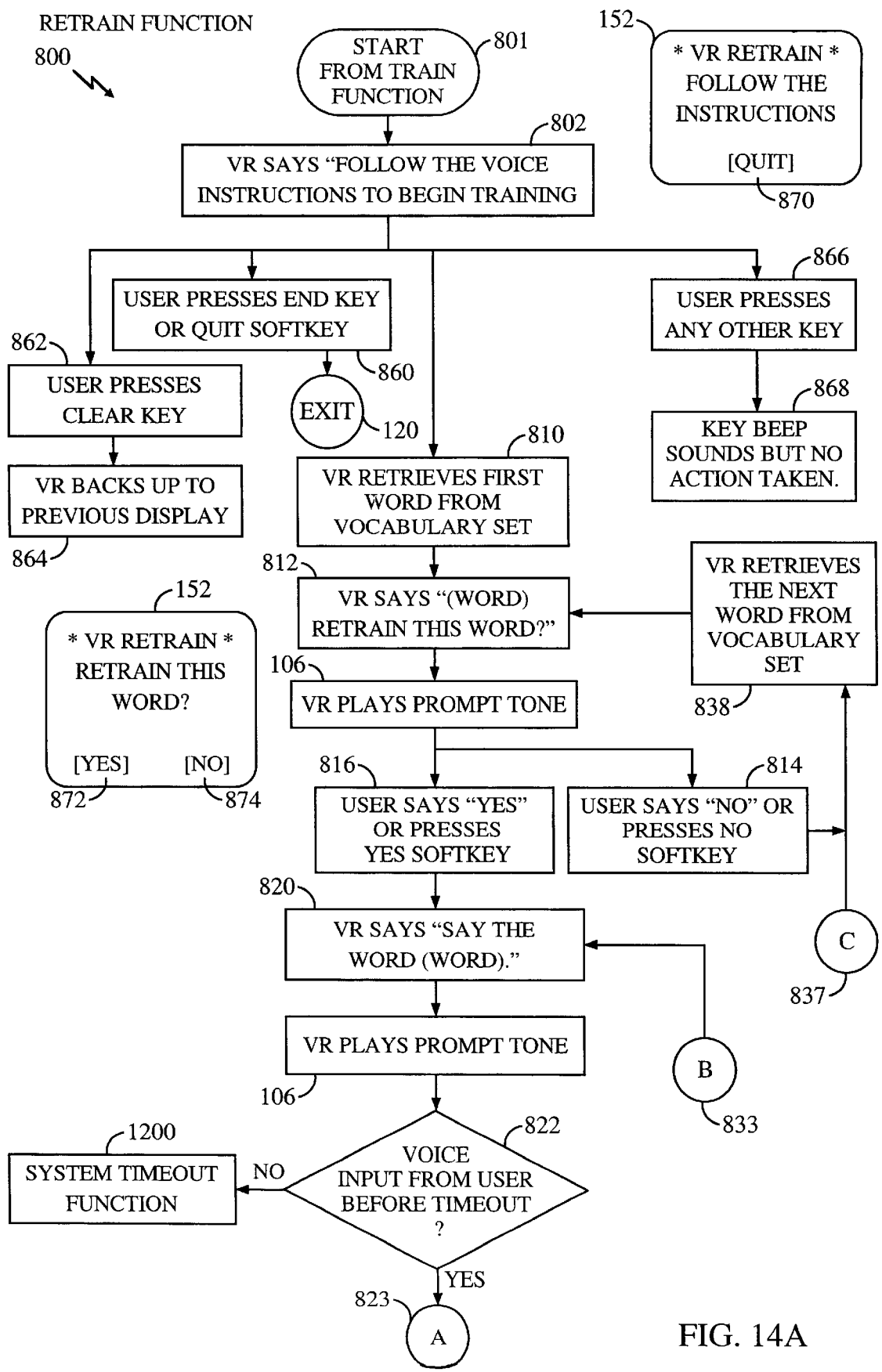
FIG. 14A–14C are flowcharts of the Retrain Function which is accessible through the Train Function, that allows the user to retrain only a subset of words within the Basic and Digit vocabulary sets.

Referring to FIG. 14A, the Retrain Function 800 is accessible from the Train Function 900. The Retrain Function 800 allows the user to retrain any portion of a vocabulary set. Upon entering the Retrain Function, VR says, "Follow the voice instructions to begin training." state 802. The user has a number of keypad options. The user can press the END key or the [QUIT] softkey 870, state 860, to advance to point 120 to exit VR. The user can press the clear key, state 862, to return back to the previous display, state 864, in the Train Function. Any other key press, state 866, results in no functional operation, state 868.

If the user does not choose any key presses that cause VR to exit the Retrain Function 800, VR in state 810 retrieves the first word in the vocabulary set being retrained. VR proceeds to state 812 and says, "(word) retrain this word?" In the query, (word) represents the current word in the vocabulary set that is to be retrained. VR then plays the prompt tone 106 to inform the user a response is requested. If the user responds with "no" or presses the "no" softkey 874, shown as state 814, VR retrieves the next word in the vocabulary set, state 838, and returns to the state 812 prompt. If the user responds "yes" or presses the "yes" softkey 872, shown as state 816, VR initiates the retraining of that word. VR proceeds to state 820 and says, "Say the word (word)" then VR plays the prompt tone 106. VR then waits for user input at state 822. If the user does not reply prior to system timeout, VR initiates the system timeout routine 1200.

Figure 14B:
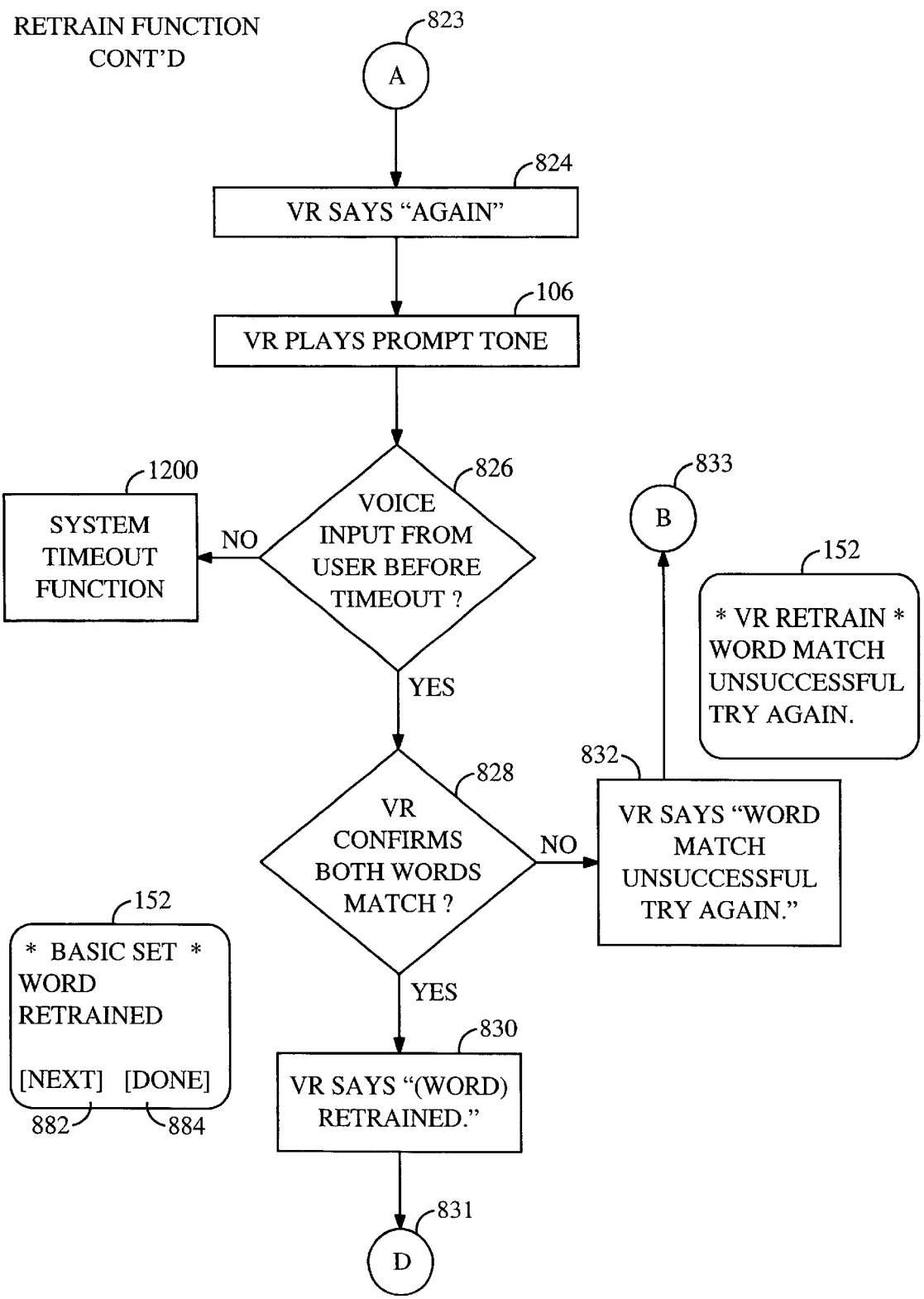

Referring to FIG. 14B, if the user replies prior to system timeout, VR in state 824 requests the user repeat the word by saying, "Again." VR plays the prompt tone 106 after this request. VR waits in state 826 for the user to repeat the word. If the system times out from this point prior to the user replying, VR initiates the system timeout routine 1200. If the user responds prior to system timeout, VR in state 828 confirms both utterances match. If the two utterances do not match, VR proceeds to state 832 and says, "Word match unsuccessful try again." VR then returns to state 820 to prompt the user to retrain the same word. If the two utterances do match, VR proceeds to state 830 and says, "(word) retrained." The handset display 152 shows softkeys for "NEXT" and "DONE" 882 and 884.

Figure 14C:
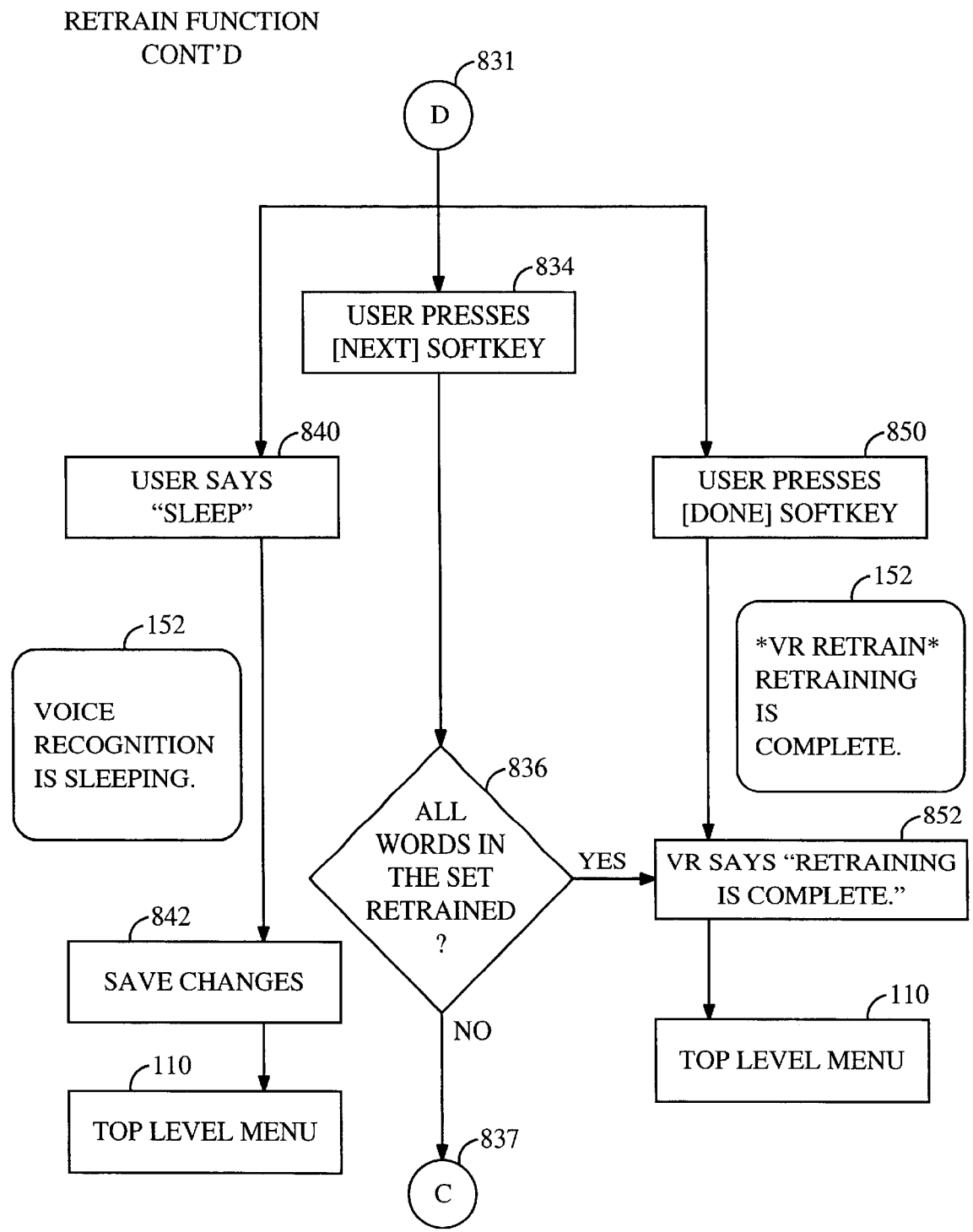

Referring to FIG. 14C, if the user chooses the "DONE" softkey, state 850, VR proceeds to state 852 and says, "Retraining is complete." VR then returns to the top level menu 110. If the user chooses the "NEXT" softkey, state 834, VR in state 836 checks to see if all words in the current vocabulary set have been retrained. If not all words have been retrained, VR returns to state 838 to retrieve the next word in the vocabulary set for retraining. If all words in the vocabulary set have been retrained, VR proceeds to state 852, says "Retraining is complete", and returns to the top level menu 110. One command available at this point that is not displayed or prompted is the "Sleep" command. If the user issues the "Sleep" command, state 840, VR saves any changes made in the current vocabulary set, state 842, then returns to the top level menu 110.

Figure 15A:
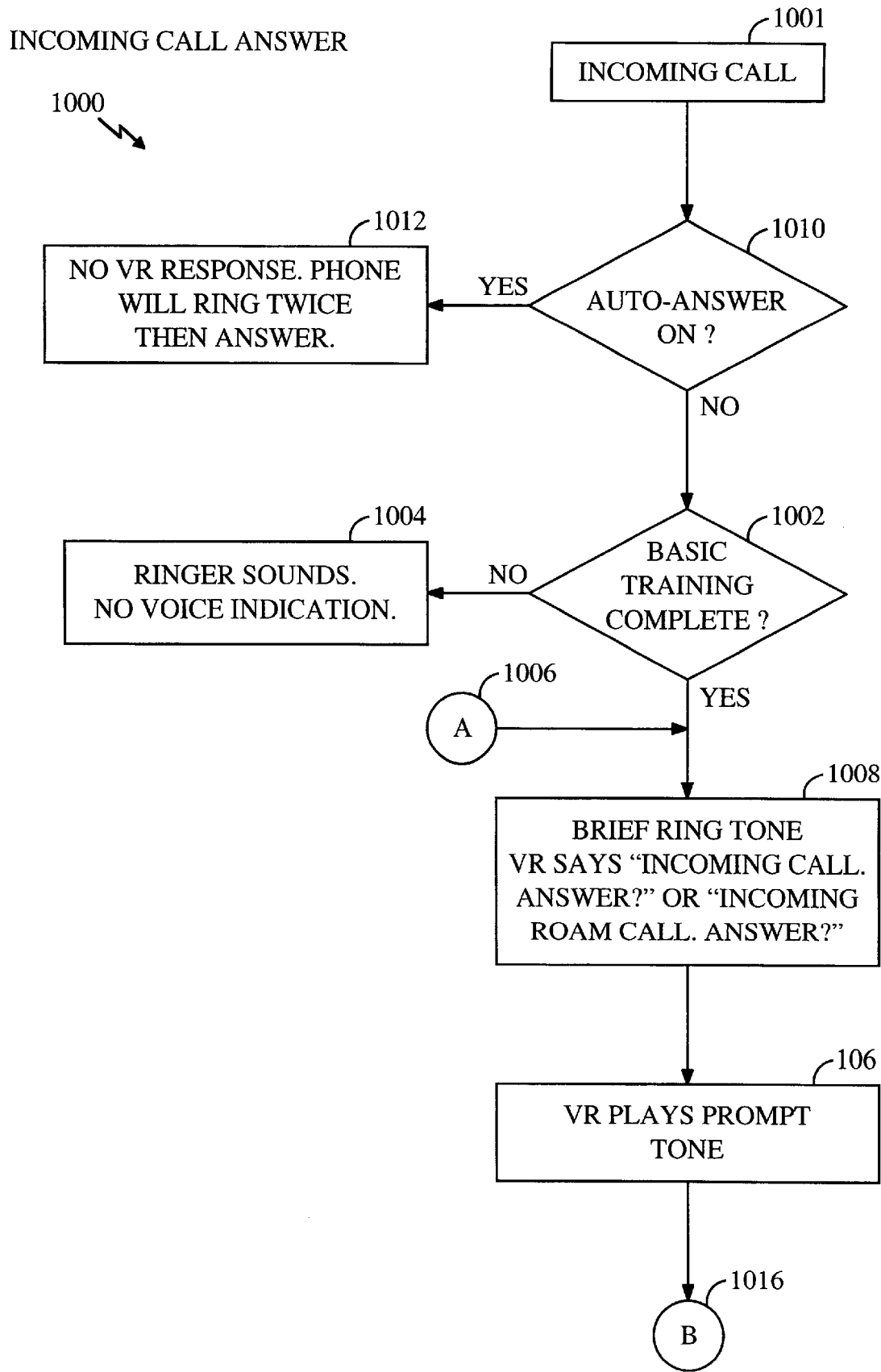
FIG. 15A–15B are flowcharts illustrating the incoming call answer feature which allows a user the ability to answer calls in a completely hands free mode.

Referring to FIG. 15A, the user is able to answer incoming calls using voice commands. When the phone receives an incoming call, VR first checks to see if the phone is in auto-answer mode, state 1010. If the phone is in auto-answer mode, there is no need for VR to receive a user response, state 1012. Instead, the phone auto-answer operates as it would in the absence of VR.

VR next checks to see that Basic training has been completed, state 1002. Without Basic training, VR will not be able to recognize user voice commands. Therefore, if Basic training has not been performed, the system proceeds to state 1004 and the phone does not initiate VR answering. Instead, the phone merely rings as it would in the absence of VR. If Basic training has already been performed, VR's response will depend on whether the incoming call is a roaming call. If the incoming call is not a roaming call, VR in state 1008 emits a brief ring tone then says, "Incoming Call. Answer?" If the incoming call is a roam call, VR in state 1008 emits a brief ring tone then says, "Incoming Roam Call. Answer?" Regardless of the prompt spoken, VR plays the prompt tone 106 to inform the user a response is requested.

Figure 15B:
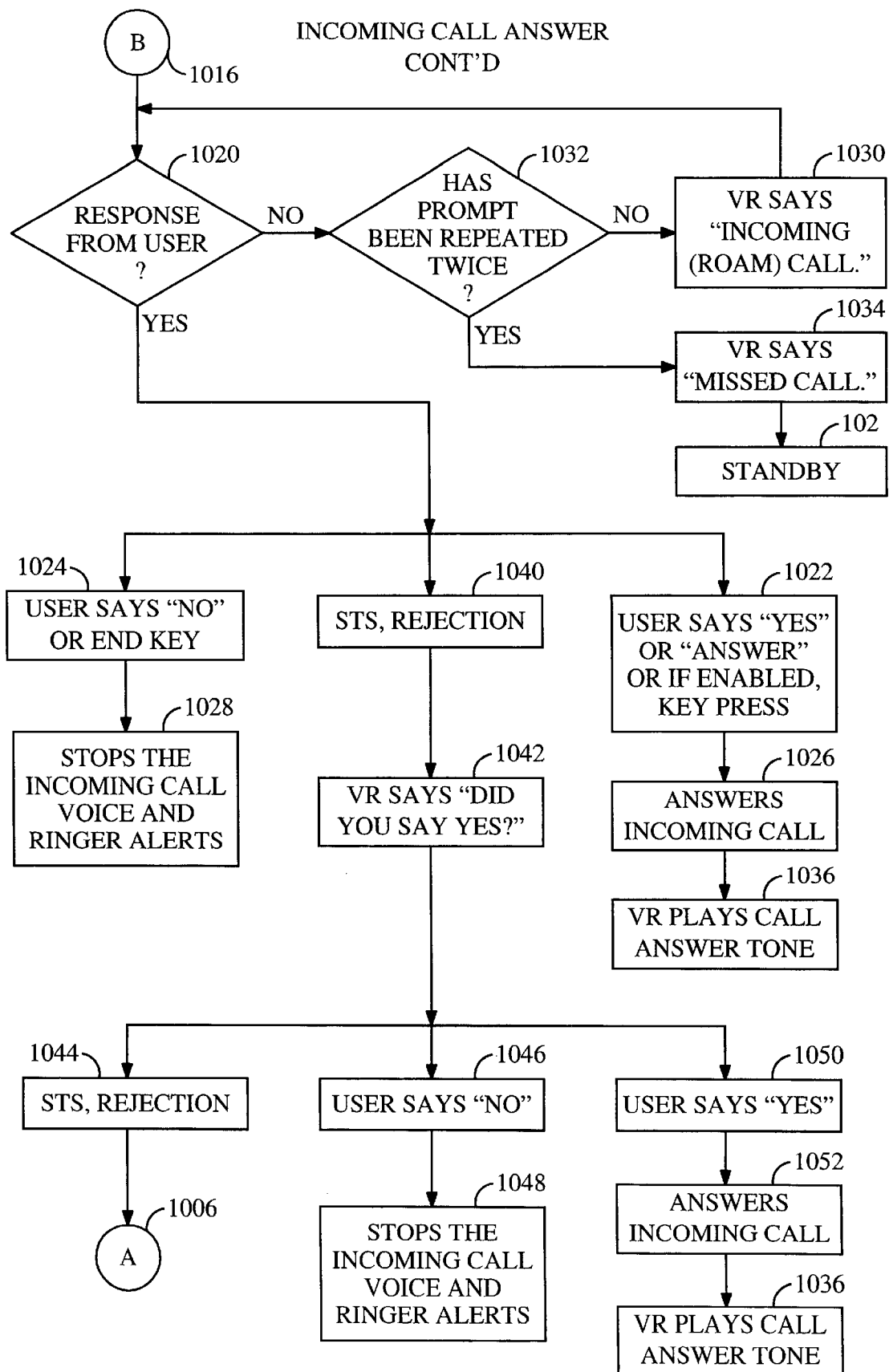

Referring to FIG. 15B, VR waits for a user response in state 1020. If the user does not respond, VR proceeds to state 1032 to see if the prompt has been repeated twice. If the prompt has not been repeated twice, VR in state 1030 says, "Incoming (Roam) Call." VR only says the word "Roam" if the incoming call is a roaming call. VR then returns to block 1020 to await user response. If, after two repetitions of the prompt, the user still does not respond, VR says, "Missed Call", state 1034. VR then returns to standby 102.

If the user responds "yes" or "answer" to any of the VR incoming call prompts, or if the user presses any of the keys that are configured to answer calls, state 1022, the phone answers the incoming call, state 1026. VR then plays a call answer tone 1036 to indicate to the user the call has been answered.

Alternatively, if the user responds "no" to the VR incoming call prompts or if the user presses any of the keys that are configured to silence the incoming alerts, state 1024, the call is not answered and no further alerts are provided for this particular call, state 1028.

If VR detects an STS or Rejection, state 1040, VR proceeds to state 1042 and says, "Did you say yes?" If the user responds "no", state 1046, VR proceeds to state 1048 and stops the incoming alerts. If the user responds "yes", state 1050, VR answers the incoming call, state 1052, then plays the call answer tone 1036. If another STS or Rejection occurs, state 1044, VR returns to point 1006 to repeat the incoming call prompts.

Figure 16:
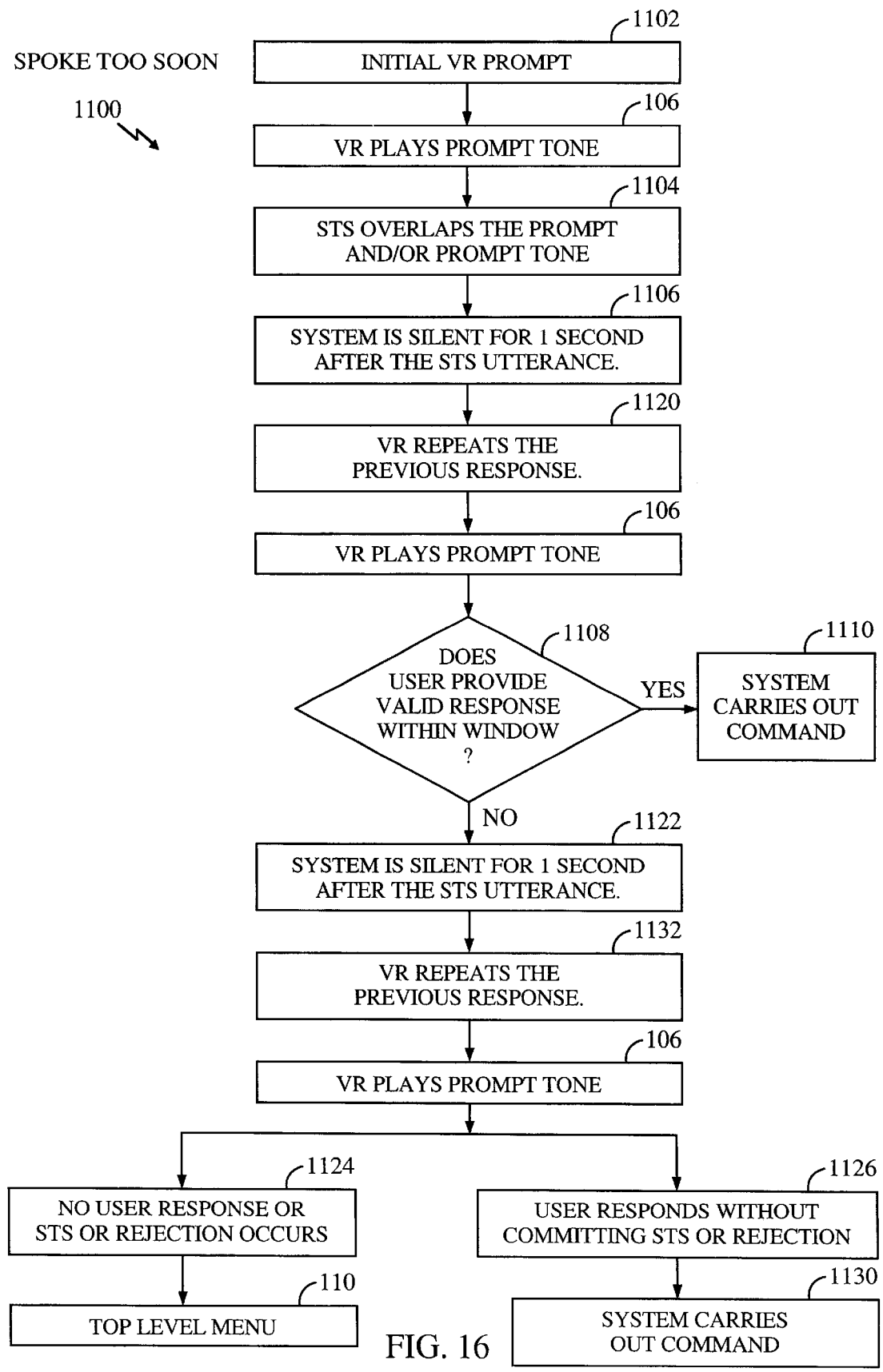
FIG. 16 is a flowchart illustrating the Spoke Too Soon mechanism that is utilized when user voice input is required.

Referring to FIG. 16, VR incorporates a Spoke Too Soon (STS) routine 1100 to handle instances where the user response is too early or overlaps the VR prompt. If an STS routine were not in place, VR would create an increase in input rejections because VR would only analyze the portion of the user response that occurs while the response window is open. Since only a portion of the user response is analyzed when STS occurs, VR cannot reliably determine the word spoken by the user. The STS routine is in place at almost all instances where a user response is required. Where the standard STS routine is not used, VR typically incorporates a modified version of the STS routine. The STS routine 1100 is active where VR prompts the user for a response, state 1102. VR typically plays a prompt tone 106 to inform the user a response is required. If VR detects an STS, state 1104, VR proceeds to state 1106 where it remains silent for 1 second after the STS utterance to allow the user to respond. VR then advances to state 1120 and repeats the previous prompt. VR again plays the prompt tone 106 to signal the user a response is required. VR waits in state 1108 for a valid user response. If the user provides a valid response, VR proceeds to state 1110 and carries out the command in the function. If VR is unable to determine the word spoken because of another STS the system remains silent for 1 second in state 1122. VR again repeats the previous prompt, state 1132, and again plays the prompt tone 106. If after the second prompt there is another STS, Rejection, or there is no user response, state 1124, VR does not attempt to correct the user. Instead, VR cancels the active function and returns to the top level menu 110. If the user responds without committing an STS or Rejection, state 1126, VR proceeds with the command, state 1130, and returns to the point in the function that utilized the STS routine.

Figure 17:
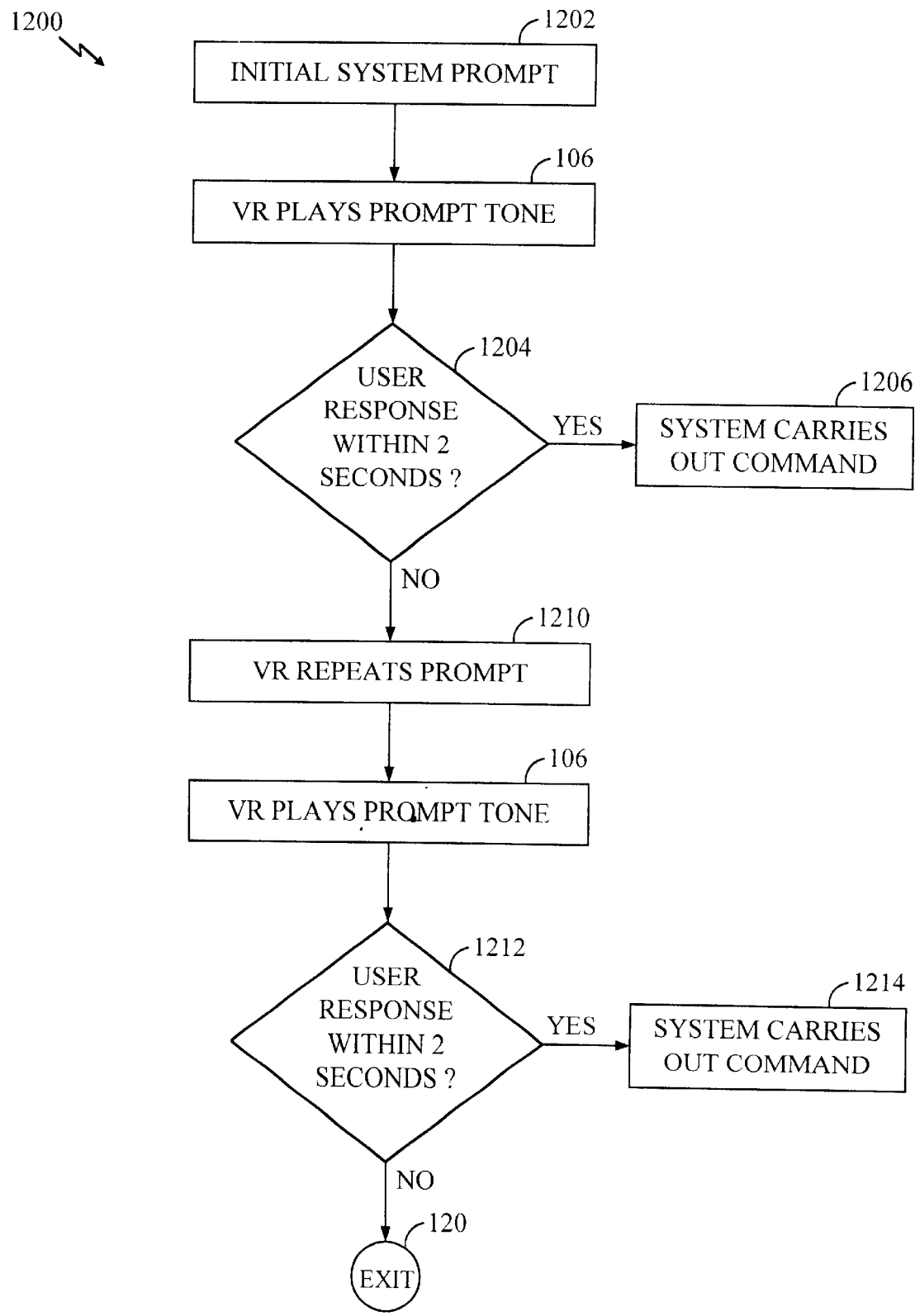
FIG. 17 is a flow chart illustrating processing of system time out, which occurs when the user has not responded in a timely manner to a prompt by the VR system.

Referring to FIG. 17, VR incorporates a System Timeout Function 1200 to handle instances where VR requests a user response and receives none. When there is no user response, the System Timeout Function 1200 allows the user another chance to reply rather than canceling the active function. VR uses the System Timeout Function 1200 for the majority of prompts but sometimes handles input timeouts specifically in the function flow charts. VR provides initial prompts and prompt tones 106 at various instances where the System Timeout Function 1200 is active, state 1202. The user is provided a 2 second response window, state 1204. If the user responds, VR proceeds to state 1206, carries out the command, and returns to the function. If the user does not respond within the 2 second response window, VR repeats the initial prompt, state 1210, and repeats the prompt tone 106. The user is again given a 2 second response window, state 1212. If the user responds, VR proceeds to state 1206, carries out the command, and returns to the function. If the user fails to respond to the second prompt VR advances to point 120 and proceeds to exit VR to standby 102.

Figure 18:
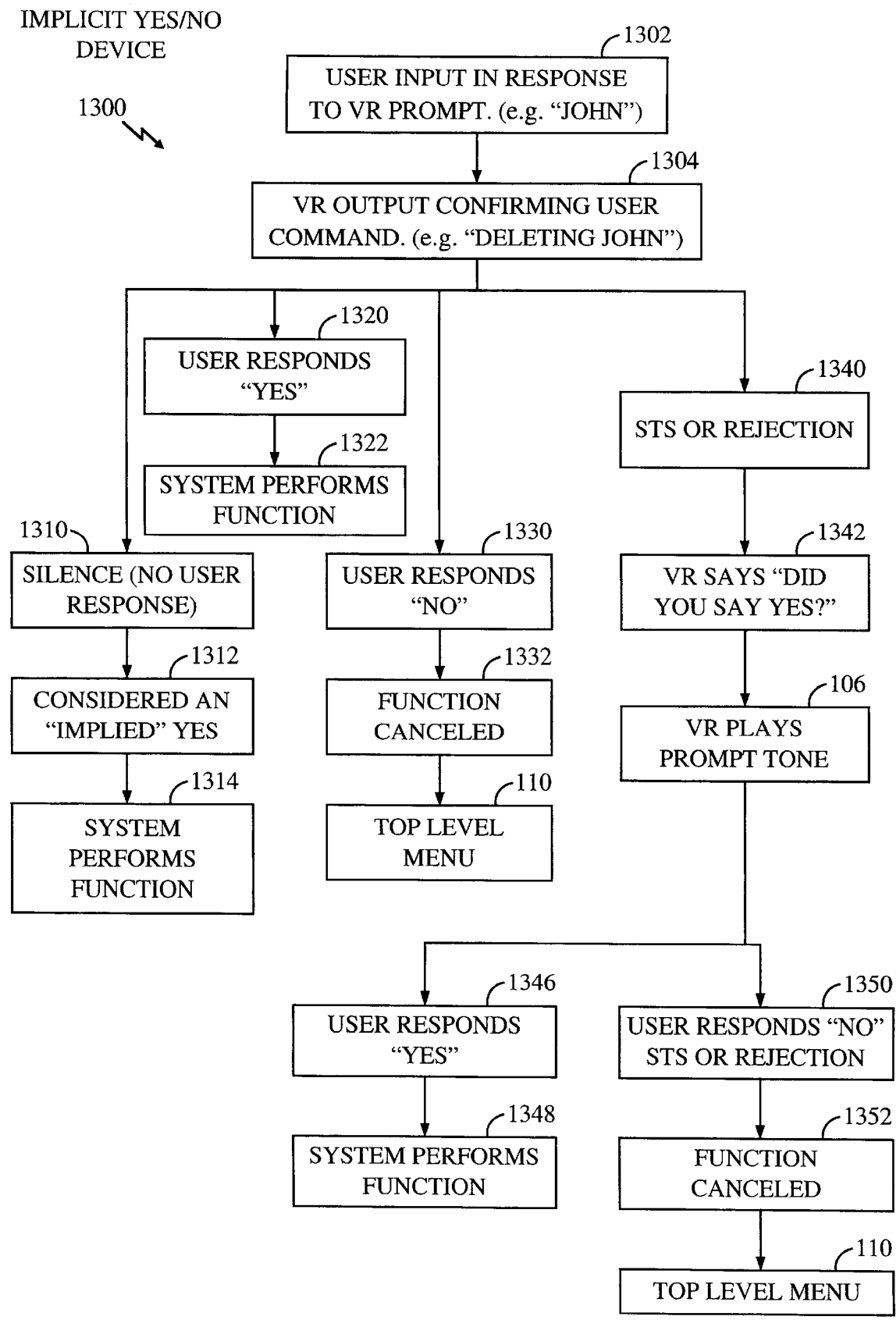
FIG. 18 is a flow chart illustrating an Implicit Yes/No Device, which is sometimes utilized when a yes/no user reply is required.

Referring to FIG. 18, VR incorporates an implicit yes/no device 1300 that processes user silence in response to a query as a "yes" response. This implicit yes/no device 1300 is selectively used in the user interface when VR expects a "yes" response from the user. The implicit yes/no device 1300 is typically used where VR receives a command from the user, state 1302, and then seeks affirmation of the command, state 1304. In the 1.5 second user response window (not depicted), the potential user responses include silence, state 1310, "yes" state 1320, "no" state 1330, and STS or Rejection, state 1340. If the user is silent, state 1310, VR considers this an implied yes, state 1312. VR proceeds to state 1314 and performs the function. If the user replies "yes", state 1320, the system performs the function, state 1322. If the user replies "no", state 1330, the function is cancelled in state 1332 and VR returns to the top level menu 110. If the response is an STS or Rejection, state 1340, VR proceeds to state 1342 where it prompts the user by saying, "Did you say yes?" VR plays the prompt tone 106 to inform the user a response is required. The user is then provided another response window. As before, if the user replies "yes", state 1346, the system performs the function, state 1346. Similarly, if the user replies "no" or if the user response is another STS or Rejection, state 1350, the function is cancelled, state 1352, and VR returns to the top level menu 110.

The previous description of the preferred embodiment is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for providing a voice recognition user interface for a phone, said method comprising:

providing a top level menu whereby all voice recognition functions can be accessed;

said voice recognition functions comprising:
   a Call Function; a Name Function; a Voicebook Function, and an Incoming Call Function;
   providing the Call Function whereby a phone call can be originated by saying a sequence of digits of a phone number followed by a command word;
   providing the Name Function whereby the phone call can be originated by saying a name previously saved in a voice recognition phonebook;
   providing the Voicebook Function whereby entries in the voice recognition phonebook will be read back to the user if the user says a corresponding List Function command word;
   providing the Incoming Call Function whereby the user is alerted to an incoming call and can answer the incoming call using a voice command; and
   providing a hidden menu whereby the voice recognition functions can be accessed prior to a user prompt.

2. The method as defined in claim 1 further comprising:
providing a Redial Function whereby the phone call can be originated by saying a corresponding Redial Function command word, said phone call is made using a phone number that corresponds to the last number called.

3. The method as defined in claim 2 further comprising:
providing an Add Function and a Delete Function within the Voicebook Function whereby:
   the user may add entries to the voice recognition phonebook by accessing the Add Function by saying a corresponding Add Function command word while in the Voicebook Function; and
   the user may delete entries in the voice recognition phonebook by accessing the Delete Function by saying a corresponding Delete Function command word while in the Voicebook Function.

4. The method as defined in claim 3 further comprising:
providing a Train Function whereby:
   the user can train a complete vocabulary set of the voice recognition user interface; and
   the user can choose to retrain only portions of the complete vocabulary set of the voice recognition user interface.

5. The method as defined in claim 1 wherein the voice recognition functions further comprise a Sleep Function whereby the voice recognition functions are placed in a standby mode by saying a predetermined sleep command.

6. The method as defined in claim 5 wherein the voice recognition functions only respond to a predetermined wake-up command when placed in the standby mode.

7. The method as defined in claim 6 wherein the predetermined wake-up command comprises a wake-up voice command.

8. The method as defined in claim 7 wherein the predetermined wake-up command further comprises a predetermined sequence of key presses.

9. The method as defined in claim 1 further comprising providing an implicit yes/no device whereby an affirmative response is implied in response to a prompt for a 'yes' or 'no' response when no response is detected within a predefined time.

* * * * *